(12) United States Patent
Hruska et al.

(10) Patent No.: US 10,690,590 B2
(45) Date of Patent: Jun. 23, 2020

(54) LIGHT PIPE FOR SPECTROSCOPY

(71) Applicant: Viavi Solutions Inc., Milpitas, CA (US)

(72) Inventors: Curtis R. Hruska, Cloverdale, CA (US); Peng Zou, Ridgefield, CT (US); Benjamin F. Catching, Santa Rosa, CA (US); Marc K. Von Gunten, Novato, CA (US); Valton Smith, Daly City, CA (US)

(73) Assignee: VIAVI Solutions Inc., San Jose, CA (US)

( * ) Notice: Subject to any disclaimer, the term of this patent is extended or adjusted under 35 U.S.C. 154(b) by 27 days.

(21) Appl. No.: 15/477,753

(22) Filed: Apr. 3, 2017

(65) Prior Publication Data

US 2017/0284930 A1    Oct. 5, 2017

Related U.S. Application Data

(60) Provisional application No. 62/318,428, filed on Apr. 5, 2016.

(51) Int. Cl.
*G01N 21/25*  (2006.01)
*G01J 3/02*   (2006.01)
(Continued)

(52) U.S. Cl.
CPC .......... *G01N 21/255* (2013.01); *G01J 3/0202* (2013.01); *G01J 3/0272* (2013.01);
(Continued)

(58) Field of Classification Search
CPC .............. G01N 2201/0813; G01N 2201/0846
See application file for complete search history.

(56) References Cited

U.S. PATENT DOCUMENTS 3,448,276 A * 6/1969 Witte .................. G01J 1/04
                                                  250/216
5,013,155 A * 5/1991 Rybak .................. G01N 21/03
                                                  250/228
(Continued)

FOREIGN PATENT DOCUMENTS

WO    WO 2014/061191 A1    4/2014

OTHER PUBLICATIONS

Partial European Search report corresponding to EP 17 16 4864, dated Aug. 18, 2017, 15 pages.

(Continued)

*Primary Examiner* — Dominic J Bologna
(74) *Attorney, Agent, or Firm* — Harrity & Harrity, LLP

(57) ABSTRACT

A spectroscopic assembly may include a spectrometer. The spectrometer may include an illumination source to generate a light to illuminate a sample. The spectrometer may include a sensor to obtain a spectroscopic measurement based on light, reflected by the sample, from the light illuminating the sample. The spectroscopic assembly may include a light pipe to transfer the light reflected from the sample. The light pipe may include a first opening to receive the spectrometer. The light pipe may include a second opening to receive the sample, such that the sample is enclosed by the light pipe and a base surface when the sample is received at the second opening. The light pipe may be associated with aligning the illumination source and the sensor with the sample.

20 Claims, 17 Drawing Sheets

(51) Int. Cl.
*G01N 21/03* (2006.01)
*G02B 27/09* (2006.01)
*G01J 3/06* (2006.01)
*G01J 3/42* (2006.01)

(52) U.S. Cl.
CPC .............. *G01J 3/0291* (2013.01); *G01J 3/06* (2013.01); *G01J 3/42* (2013.01); *G01N 21/03* (2013.01); *G01N 21/031* (2013.01); *G02B 27/0994* (2013.01); *G01N 2201/024* (2013.01); *G01N 2201/0813* (2013.01)

(56) References Cited

U.S. PATENT DOCUMENTS

| | | | | |
|---|---|---|---|---|
| 5,747,808 | A | * | 5/1998 | Wong ................. G01N 21/0303 250/339.13 |
| 2006/0184162 | A1 | * | 8/2006 | Smith ..................... A61F 9/007 606/4 |
| 2009/0171591 | A1 | | 7/2009 | Timmis et al. |
| 2010/0026988 | A1 | * | 2/2010 | Cros ....................... B60T 17/22 356/51 |
| 2014/0131578 | A1 | * | 5/2014 | Hruska ................ G01N 21/359 250/339.02 |
| 2015/0247795 | A1 | | 12/2015 | Hruska et al. |

OTHER PUBLICATIONS

Gasmet, "FTIR FAQ", http://www.gasmet.com/technology/ftir-faq, Sep. 12, 2014, 4 pages.

AFAB Enterprises, "hand refractometer", http://refractometer.com/hand-refractometer/, Jul. 1, 2002, 5 pages.

Extended European Search Report for Application No. EP17164864, dated Nov. 27, 2017, 12 pages.

* cited by examiner

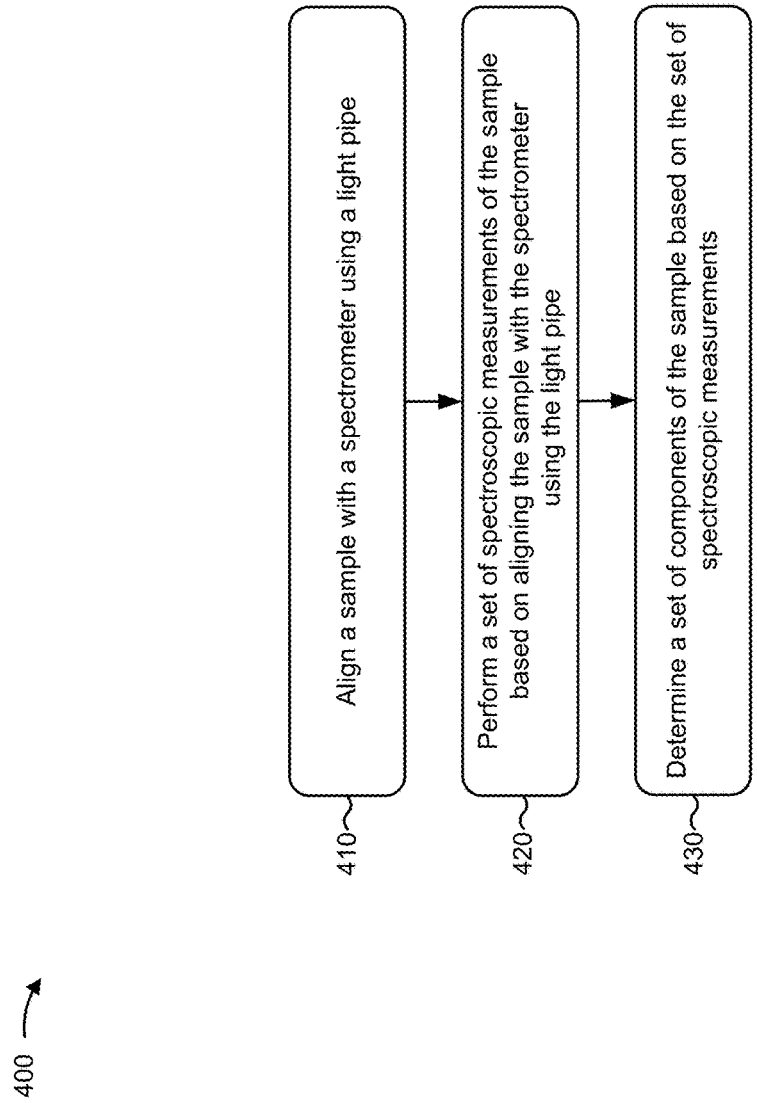

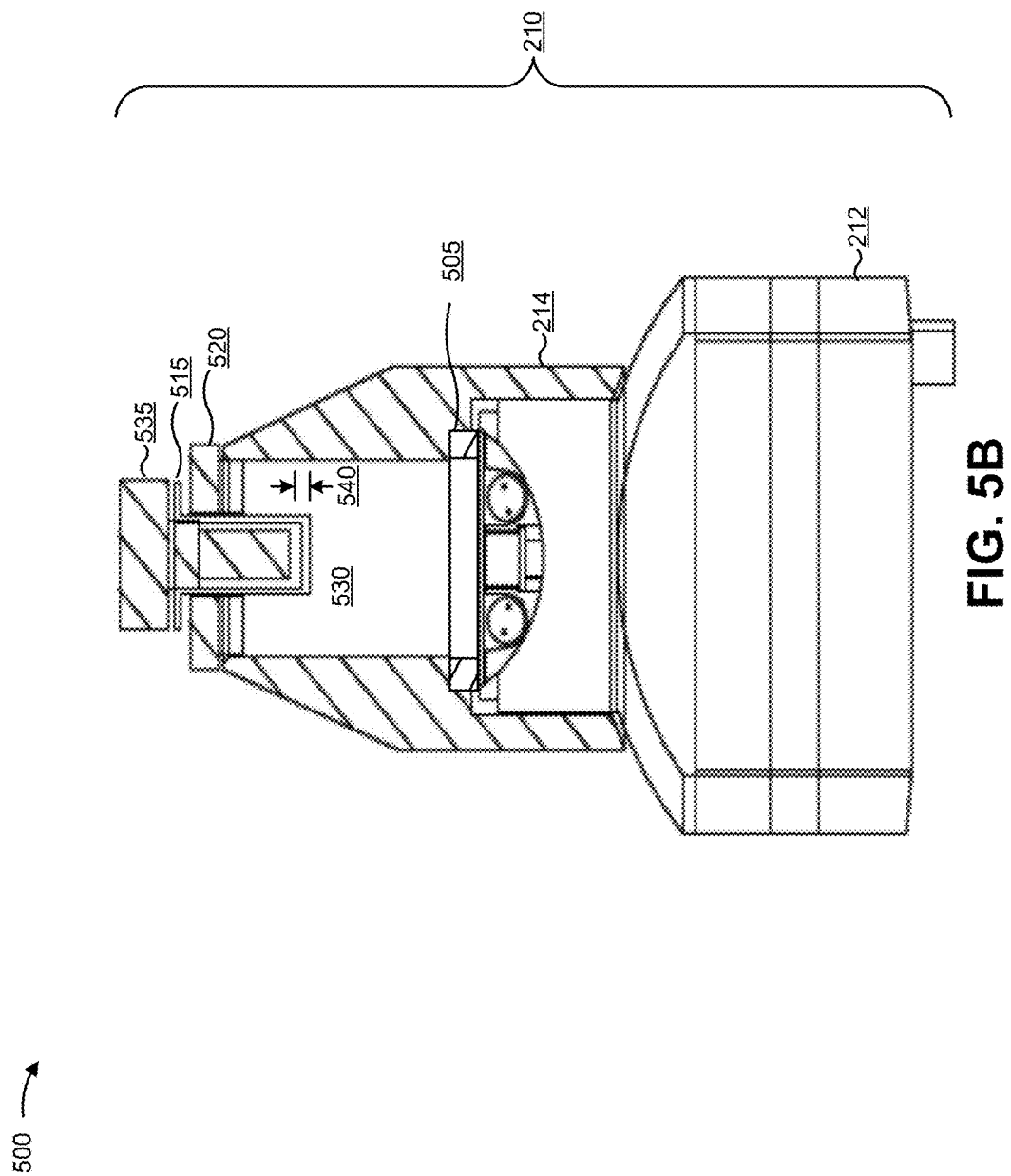

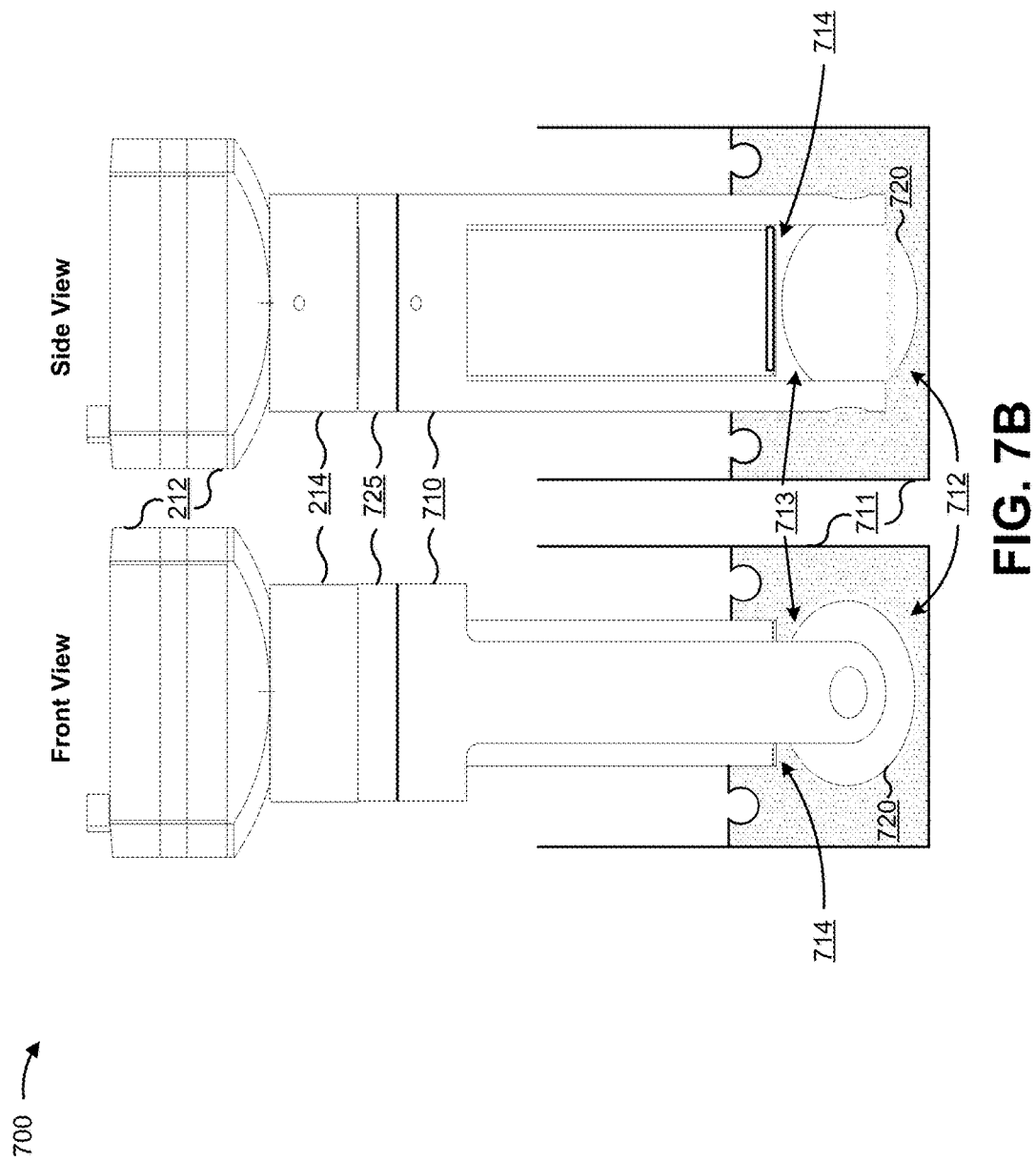

LIGHT PIPE FOR SPECTROSCOPY

RELATED APPLICATION(S)

This application claims priority under 35 U.S.C. § 119 to U.S. Provisional Patent Application No. 62/318,428, filed on Apr. 5, 2016, the content of which is incorporated by reference herein in its entirety.

BACKGROUND

Raw material identification may be utilized for quality-control of products, such as pharmaceutical products, food products, or the like. For example, raw material identification may be performed on a medical compound to determine whether component ingredients of the medical compound correspond to a packaging label associated with the medical compound. Spectroscopy may facilitate non-destructive raw material identification of a product. For example, spectroscopy may be performed on a tablet or pill packaged into a blister pack to determine whether the tablet or pill corresponds to a packaging label associated with the blister pack.

SUMMARY

According to some possible implementations, a spectroscopic assembly may include a spectrometer. The spectrometer may include an illumination source to generate a light to illuminate a sample. The spectrometer may include a sensor to obtain a spectroscopic measurement based on light, reflected by the sample, from the light illuminating the sample. The spectroscopic assembly may include a light pipe to transfer the light reflected from the sample. The light pipe may include a first opening to receive the spectrometer. The light pipe may include a second opening to receive the sample, such that the sample is enclosed by the light pipe and a base surface when the sample is received at the second opening. The light pipe may be associated with aligning the illumination source and the sensor with the sample.

According to some possible implementations, an apparatus may include a body portion. The body portion may include a cavity. The cavity may extend axially from a first opening of the body portion to a second opening of the body portion. The second opening of the body portion may be associated with receiving a sample for spectroscopy. The first opening of the body portion may be associated with receiving a spectrometer such that the spectrometer is separated from the sample by a particular distance to prevent the spectrometer from being in contact with the sample.

According to some possible implementations, an apparatus may include a spectroscopic assembly. The spectroscopic assembly may include a spectrometer. The spectrometer may include an illumination source and a spectroscopic sensor. The spectroscopic assembly may include a light pipe. The light pipe may include a turned cavity. The light pipe may include a first opening to receive the spectrometer. The light pipe may include a second opening. The second opening may include a protective window to prevent a sample from entering the turned cavity and coming into contact with the spectrometer. The turned cavity may be optically reflective. The spectroscopic assembly may include a support structure. The support structure may be mounted to the light pipe. The support structure may support a surface a particular distance from the illumination source. The particular distance may permit the sample to be positioned between the protective window and the surface.

BRIEF DESCRIPTION OF THE DRAWINGS

FIG. 4 is a flow chart of an example process for performing raw material identification using a spectrometer;

FIGS. 5A and 5B are diagrams of an example implementation relating to the example process shown in FIG. 4;

FIGS. 7A and 7B are diagrams of yet another example implementation relating to the example process shown in FIG. 4;

DETAILED DESCRIPTION

The following detailed description of example implementations refers to the accompanying drawings. The same reference numbers in different drawings may identify the same or similar elements.

Raw material identification (RMID) is a technique utilized to identify components (e.g., ingredients) of a particular sample for identification, verification, or the like. For example, RMID may be utilized to verify that ingredients in a pharmaceutical compound correspond to a set of ingredients identified on a label. A spectrometer may be utilized to perform spectroscopy on a sample (e.g., the pharmaceutical compound) to determine components of the sample. The spectrometer may determine a set of spectroscopic measurements of the sample and may provide the set of spectroscopic measurements for classification.

However, when the spectrometer directs light toward a sample, light may disperse, which may reduce a reliability of a measurement. Moreover, it may be difficult to position the spectrometer and a sample at an ideal separation for performing a measurement. Implementations, described herein, may utilize a light pipe (e.g., a light conduit or a light relay optic) to direct light between a spectroscopic sensor of a spectrometer and a sample. In this way, an accuracy of a spectroscopic measurement may be improved, thereby improving RMID relative to performing spectroscopy without a light pipe. Moreover, spectroscopic measurements may be performed more rapidly, based on the light pipe ensuring a correct alignment and separation between a sample and the spectroscopic sensor, thereby reducing a time and/or a cost associated with verification of components of a sample relative to utilizing a spectrometer without a light pipe.

Figure 1:
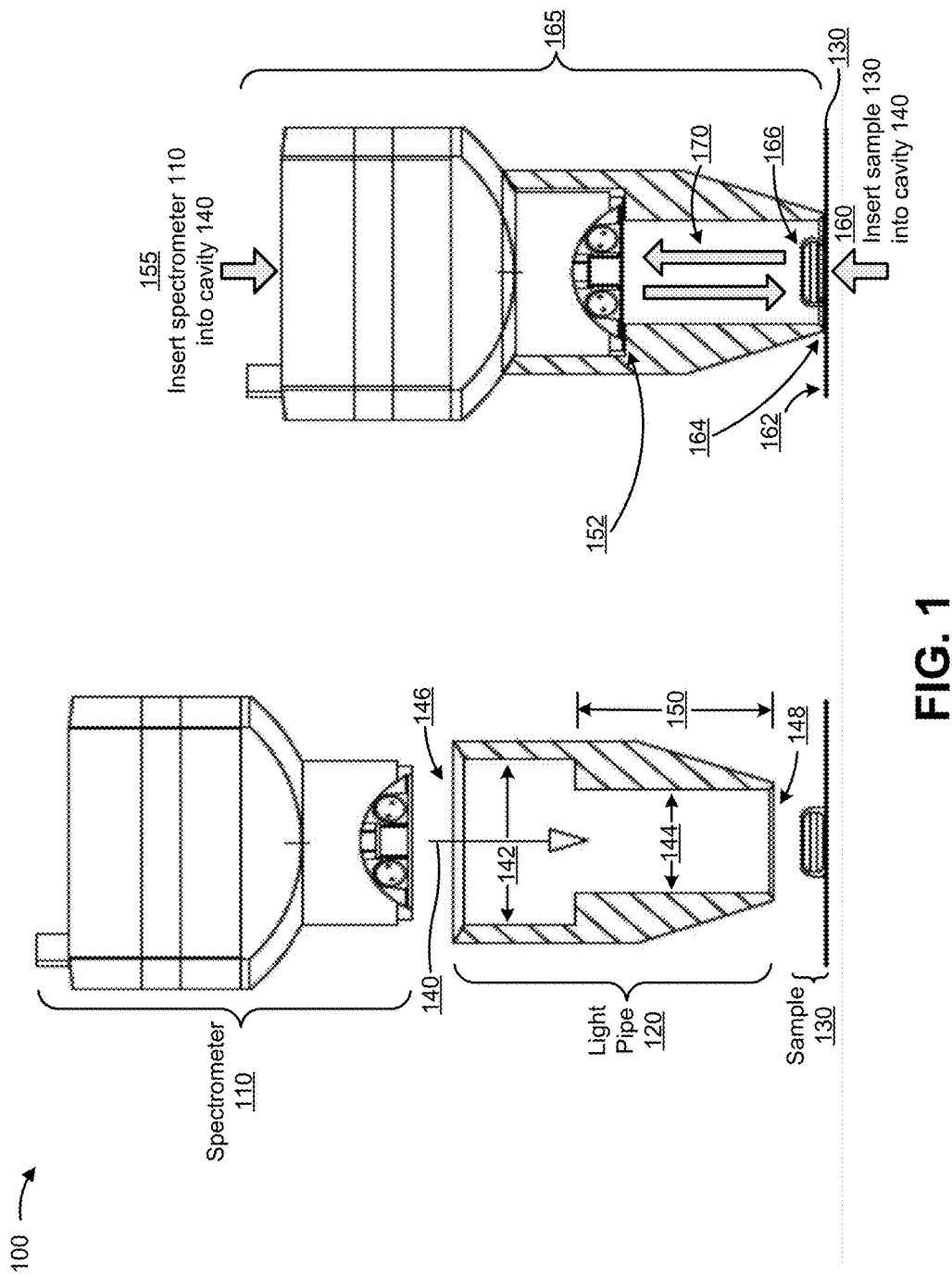
FIG. 1 is a diagram of an overview of an example implementation described herein.

FIG. 1 is a diagram of an overview of an example implementation 100 described herein. As shown in FIG. 1, example implementation 100 may include a spectrometer 110, a light pipe 120, and a sample 130. FIG. 1 shows a cross-sectional view of spectrometer 110, light pipe 120, and sample 130.

As further shown in FIG. 1, and by reference number 140, when attaching spectrometer 110 to light pipe 120, spectrometer 110 may be axially aligned to a cavity 140 of light pipe 120. Light pipe 120 may undergo a turning procedure to form cavity 140 (e.g., a body portion may be turned using a diamond turning procedure to generate a turned cavity). In some implementations, cavity 140 may have a circular cross-sectional shape, an elliptical cross-sectional shape, a rectangular cross-sectional shape, an octagonal cross-sectional shape, a square cross-sectional shape, or the like based on an expected shape of sample 130, manufacturability of a particular cross-sectional, or the like. Cavity 140 may include a first portion with a first diameter 142 and a second portion with a second diameter 144. Cavity 140 may extend axially from a first opening 146 to a second opening 148. In some implementations, cavity 140 may include a reflective interior surface (e.g., anodized aluminum surface or aluminized Mylar foil surface). The second portion of cavity 140 may extend axially for a length 150, which may be selected based on a predicted ideal distance (or within a particular range of distances) between a spectroscopic sensor of spectrometer 110 and sample 130. In some implementations, light pipe 120 may be a hollow light pipe that is coated in a reflective material, such as a gold based material, a silver based material, another metal based material, a dielectric based material, or the like. In some implementations light pipe 120 may be a solid light pipe that is coated in a reflective material. For example, a portion of cavity 140 may be a solid, transmissive material, such as glass, plastic, or another material that is optically transmissive at a particular spectral range (e.g., Zinc-Sulfide (ZnS) for infrared wavelengths, fused silica for ultraviolet wavelengths, etc.), and may direct light via the solid transmissive material. In some implementations, light pipe 120 may be a solid light pipe that is not coated in a reflective material (e.g., a light pipe that causes the total internal reflection effect (or a threshold internal reflection associated with the total internal reflection effect) to direct light between spectrometer 110 and a sample).

As further shown in FIG. 1, and by reference number 155, when attaching spectrometer 110 to light pipe 120, an end of spectrometer 110 may be inserted into cavity 140 through opening 146. For example, the end of spectrometer 110, which is associated with transmitting light for a spectroscopic measurement, may be inserted into the first portion of cavity 140. In another example, light pipe 120 may receive an external light source (e.g., external to spectrometer 110) and may cause the external light source to direct light toward sample 130 and return the light toward spectrometer 110. A width of the first portion (i.e., diameter 142) may be greater than a width of the second portion (i.e., diameter 144). In this way, when spectrometer 110 is inserted through opening 146 into cavity 140, spectrometer 110 may be caused to be positioned contiguous to surface 152 (e.g., a mounting surface) and at length 150 (e.g., a 10 millimeter length, a 120 millimeter length, or the like) from sample 130. In some implementations, cavity 140 may include a protective window (e.g., a translucent sapphire glass window that prevents spectrometer 110 from coming into contact with sample 130). For example, cavity 140 may include the protective window (e.g., a transparent and/or translucent window that may include an anti-reflective coating, such as a single anti-reflective coating, a double anti-reflective coating, or the like) mounted at surface 152, at a position in the second portion of cavity 140, at opening 148, or the like. In this way, light pipe 120 permits transmittal of light between spectrometer 110 and sample 130 (e.g., in both a transmission direction toward sample 130 and a reception direction toward spectrometer 110 using a single light pipe 120 and cavity 140) but insulates the end of spectrometer 110 from particulates that enter opening 148, thereby reducing a maintenance cost relative to spectrometer 110 not being insulated by a protective window. In another example, the protective window may include a circular polarizer portion (e.g., that reduces specular reflection toward spectrometer 110 relative to utilizing a window lacking a polarizer).

As further shown in FIG. 1, and by reference number 160, when utilizing spectrometer 110 and light pipe 120 (referred to as "assembly 165"), sample 130 (e.g., a pill in a blister pack) may be inserted into the second portion of cavity 140 through opening 148. For example, a surface 162, on which sample 130 is positioned, may be positioned contiguous to a surface 164 of light pipe 120 causing a sample container 166, in which sample 130 is positioned, (e.g., a portion of the blister pack enclosing the pill in translucent plastic or the like) to be enclosed by the second portion of cavity 140. As shown by reference number 170, light may be directed by light pipe 120 between the end of spectrometer 110 and sample container 166 (e.g., toward sample 130). For example, spectrometer 110 may perform a spectroscopic measurement of sample 130, and may perform RMID based on the measurement.

As indicated above, FIG. 1 is provided merely as an example. Other examples are possible and may differ from what was described with regard to FIG. 1. For example, while implementations will be described in terms of a sample in the form of a pill, the disclosure is not limited to pill samples and may be used other types of samples, such as granular samples, food samples, liquid samples, solvent samples, or the like.

In this way, light pipe 120 ensures that light is directed between spectrometer 110 and sample 130. Based on light pipe 120 enclosing sample 130, light pipe 120 reduces an amount of light from spectrometer 110 that is lost and/or an amount of light from an ambient source that is gained relative to sample 130 being exposed, thereby improving an accuracy of a spectroscopic measurement, reducing an amount of light that may be generated to obtain the spectroscopic measurement, ensuring a relatively uniform illumination of sample 130, reducing an amount of time required to perform the spectroscopic measurement.

Furthermore, based on length 150 being selected based on an ideal separation between spectrometer 110 and sample 130, light pipe 120 reduces a difficulty in aligning spectrometer 110 and sample 130 for spectroscopy relative to being required to manually judge the separation. For example, a user of spectrometer 110 may be provided with a set of light pipes 120 associated with a set of different lengths 150 and corresponding to a set of different samples 130, and a particular light pipe 120 may be selected with an associated length 150 based on a sample 130 that is to be measured.

Figure 2:
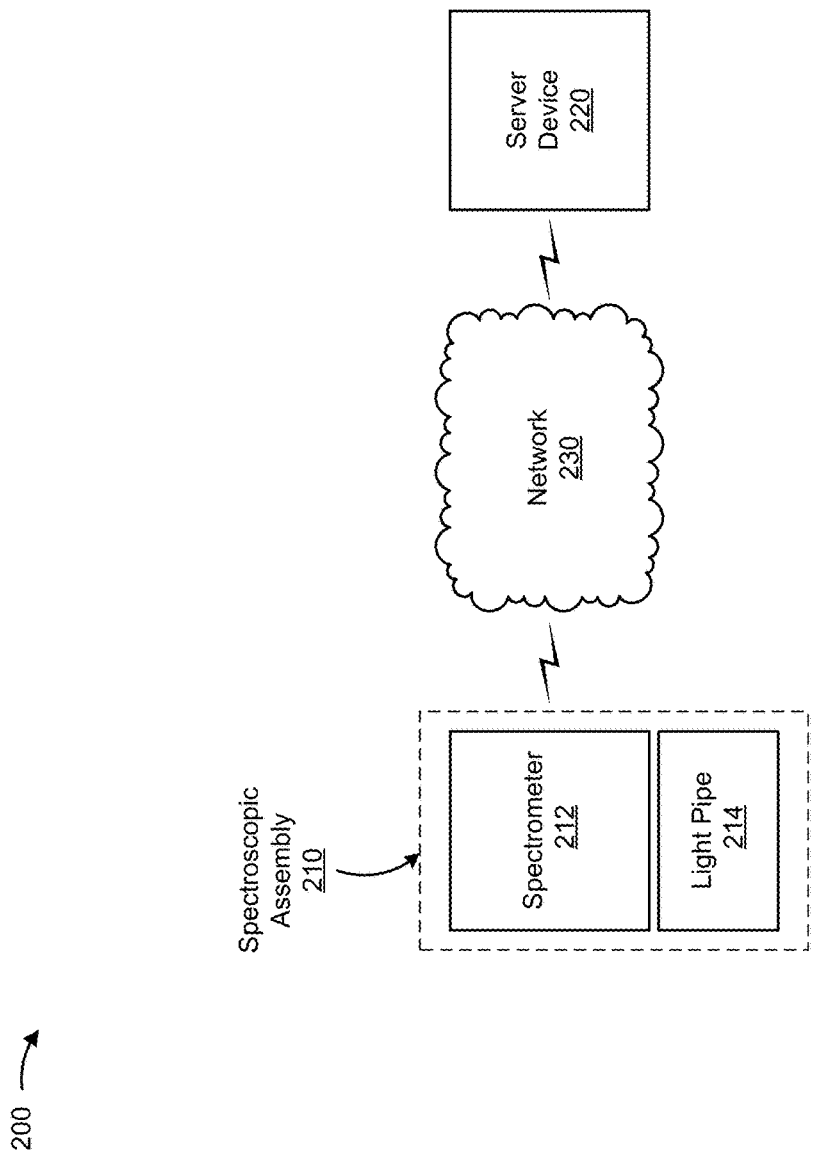
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a spectroscopic assembly 210, which includes a spectrometer 212 and a light pipe 214, a server device 220, and a network 230. Devices of environment 200 may interconnect via wired connections, wireless connections, or a combination of wired and wireless connections.

Spectroscopic assembly 210 includes one or more devices capable of performing a spectroscopic measurement on a sample. For example, spectroscopic assembly 210 may include spectrometer 212 (e.g., a spectrometer device) that performs spectroscopy (e.g., vibrational spectroscopy, such as a near infrared (NIR) spectrometer, a mid-infrared spectroscopy (mid-IR), Raman spectroscopy, X-ray spectroscopy, ultraviolet (UV) spectroscopy, deep-UV spectroscopy, visible light spectroscopy, or the like). In some implementations, spectroscopic assembly 210 may be incorporated into a wearable device, such as a wearable spectrometer or the like. In some implementations, spectroscopic assembly 210 may include a spectroscopic module (e.g., spectrometer 212) that includes a set of components, such as an illumination source that generates light, a sensor that receives light and generates a spectroscopic measurement (e.g., a measurement of a set of wavelengths of light), or the like. In some implementations, spectroscopic assembly 210 may include a set of disposable portions that are replaced after each use, such as a disposable dip probe, a disposable cap, or the like. In some implementations, spectroscopic assembly 210 may include a set of non-disposable portions, such as a reusable dip probe, a reusable cap, or the like.

In some implementations, spectroscopic assembly 210 may include a processing unit to perform RMID based on a spectroscopic measurement performed by spectrometer 212. In some implementations, spectroscopic assembly 210 may include a calibration unit to perform a calibration of spectrometer 212 and/or calibrate RMID. In some implementations, spectroscopic assembly 210 may include an apparatus (e.g., light pipe 214). In some implementations, spectroscopic assembly 210 corresponds to assembly 165 shown in FIG. 1. In some implementations, spectrometer 212 corresponds to spectrometer 110 shown in FIG. 1. In some implementations, light pipe 214 corresponds to light pipe 120 shown in FIG. 1. In some implementations, spectroscopic assembly 210 may receive information from and/or transmit information to another device in environment 200, such as server device 220.

Server device 220 includes one or more devices capable of storing, processing, and/or routing information relating to a spectroscopic measurement of a sample. For example, server device 220 may include a server that receives a spectroscopic measurement of a sample and performs RMID to identify a composition (e.g., a set of ingredients) of the sample. In some implementations, server device 220 may include a communication interface that allows server device 220 to receive information from and/or transmit information to other devices in environment 200.

Network 230 includes one or more wired and/or wireless networks. For example, network 230 may include a cellular network (e.g., a long-term evolution (LTE) network, a 3G network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
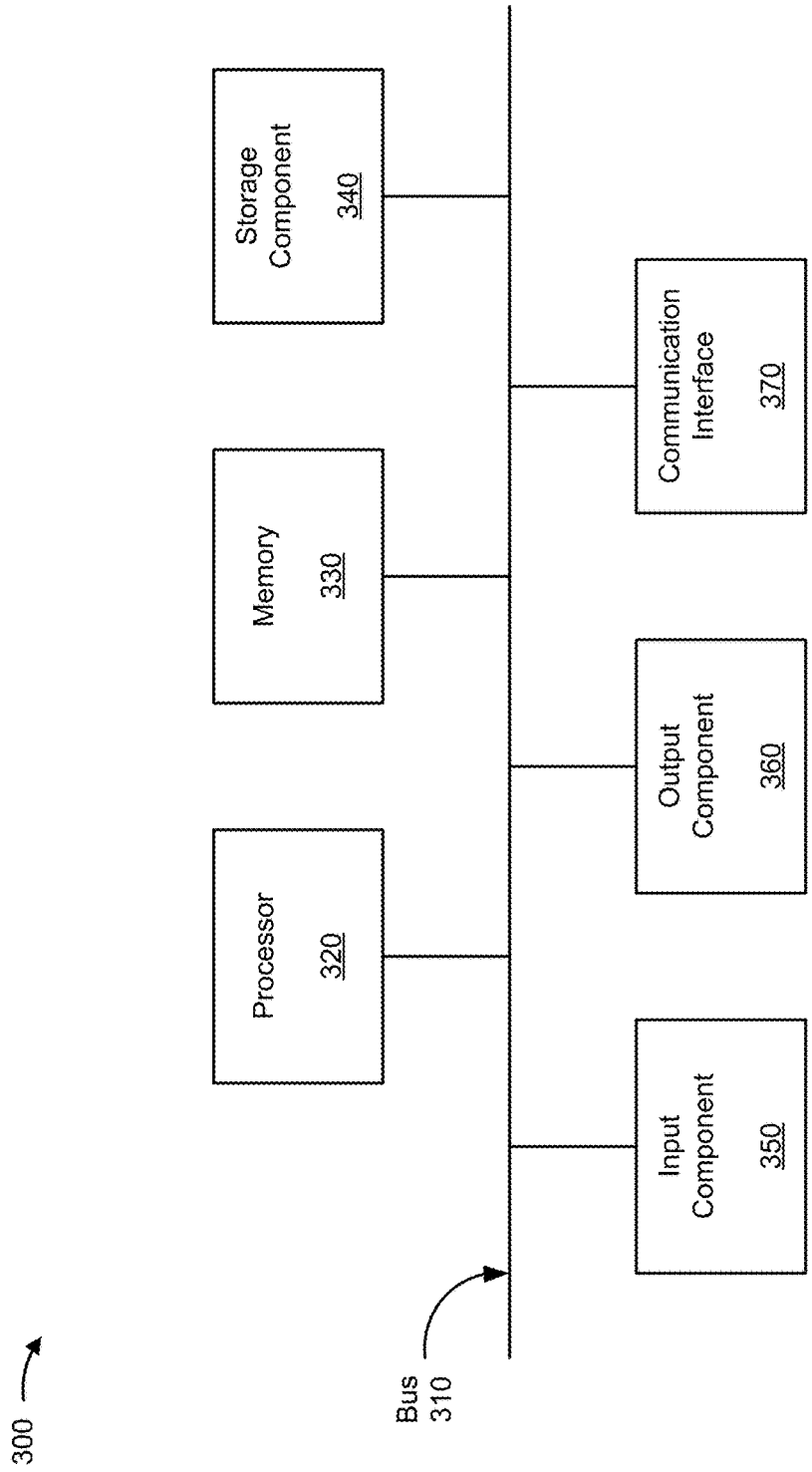
FIG. 3 is a diagram of example components of one or more devices of FIG. 2.

FIG. 3 is a diagram of example components of a device 300. Device 300 may correspond to spectroscopic assembly 210 (e.g., spectrometer 212) and/or server device 220. In some implementations, spectroscopic assembly 210 (e.g., spectrometer 212) and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software.

Processor 320 is a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for performing raw material identification using a spectrometer. In some implementations, one or more process blocks of FIG. 4 may be performed with respect to spectroscopic assembly 210 (e.g., spectrometer 212). In some implementations, one or more process blocks of FIG. 4 may be performed with respect to another device or a group of devices separate from or including spectroscopic assembly 210, such as server device 220. The process blocks of FIG. 4 will be described with reference to FIGS. 5A, 5B, 6A, 6B, 6C, 7A, and 7B.

Figure 5A:
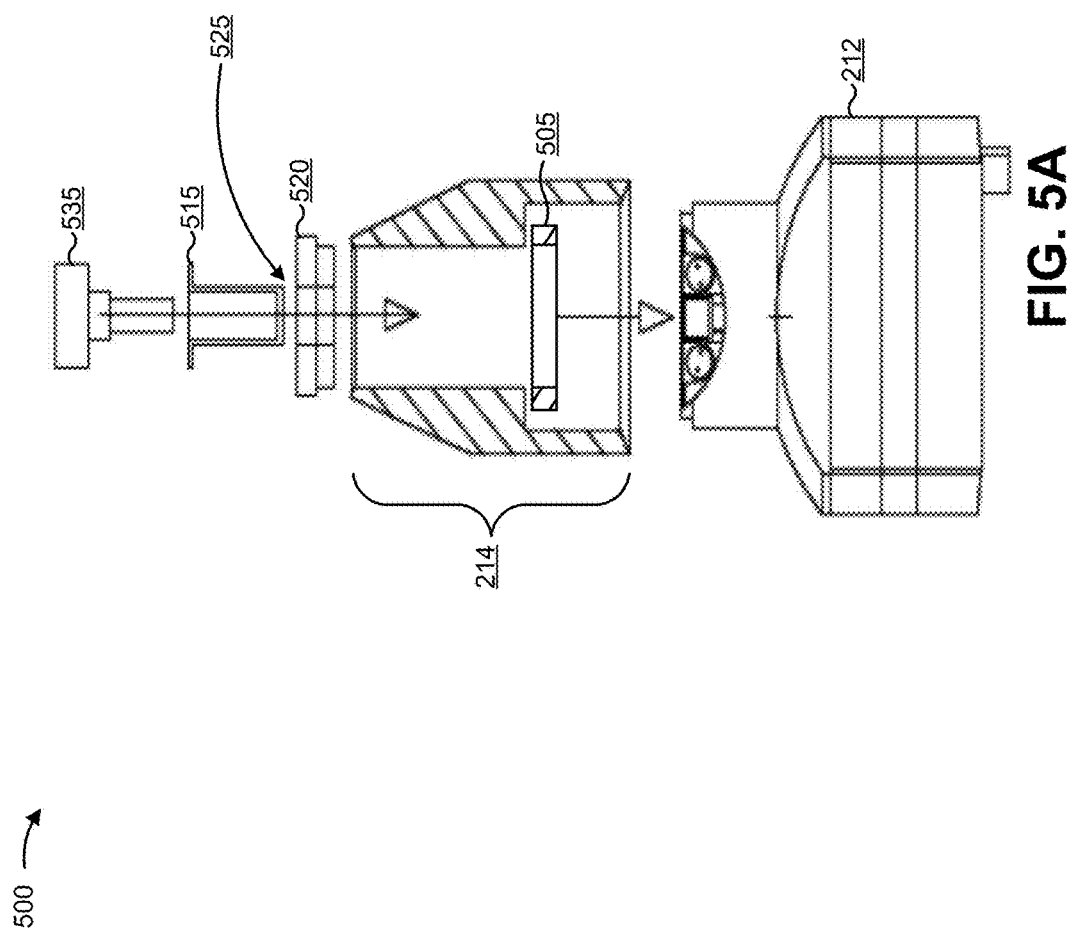

FIGS. 5A and 5B are diagrams of an example implementation 500 relating to example process 400 shown in FIG. 4. FIGS. 5A and 5B show an example of a spectroscopic assembly 210 to perform raw material identification.

Figure 6A:
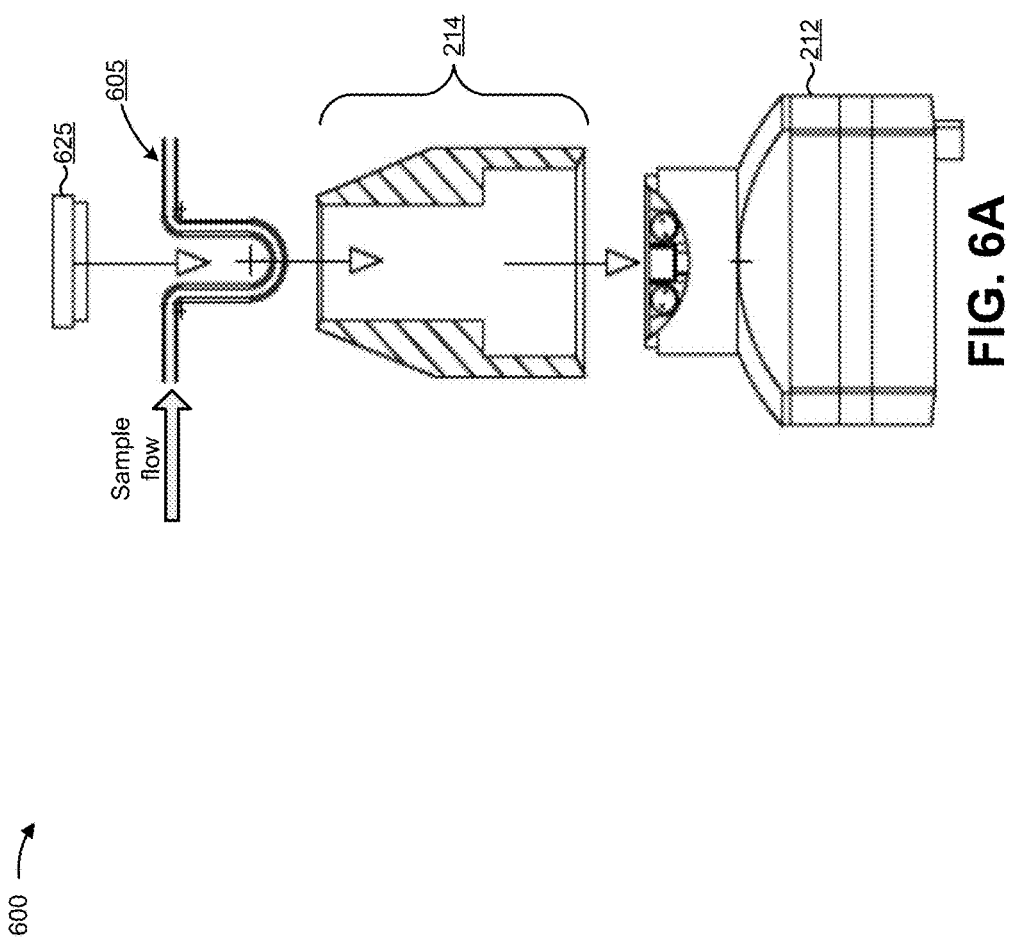
FIGS. 6A-6C are diagrams of another example implementation relating to the example process shown in FIG. 4.
Figure 6B:
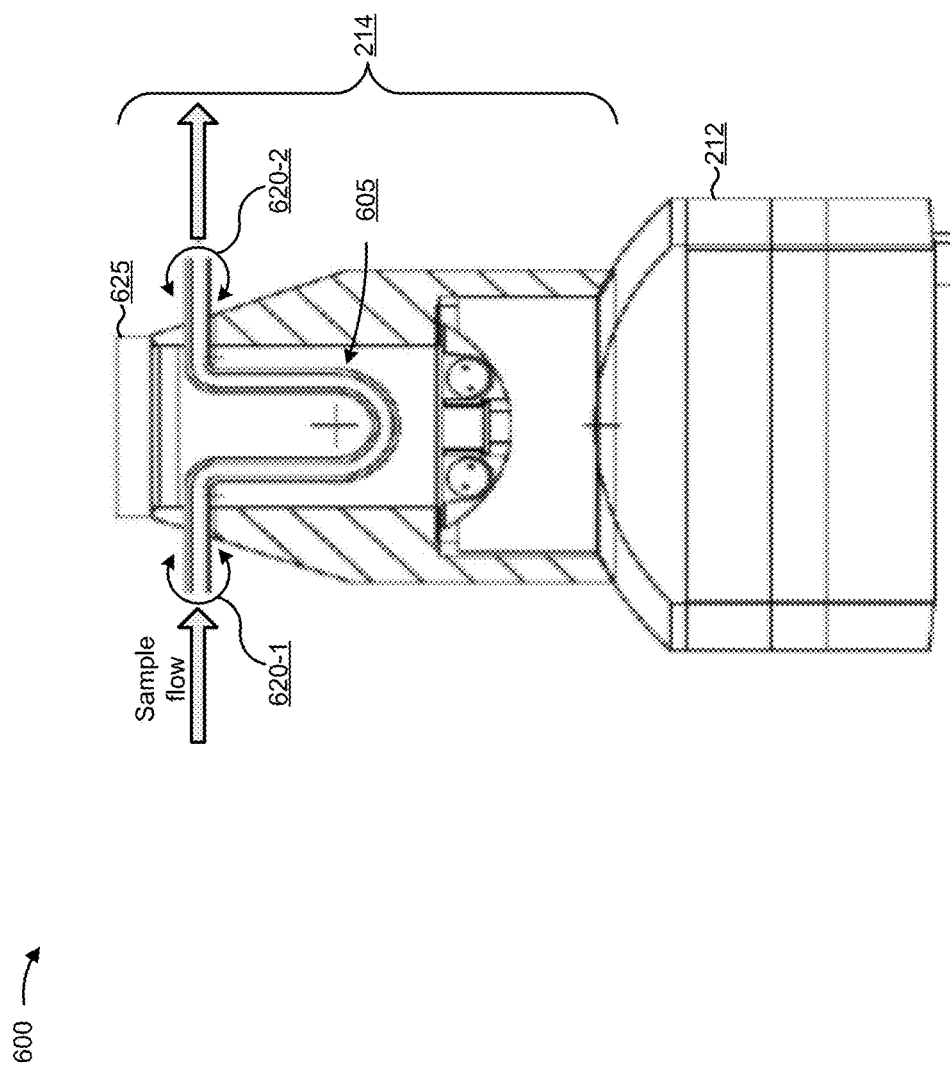
Figure 6C:
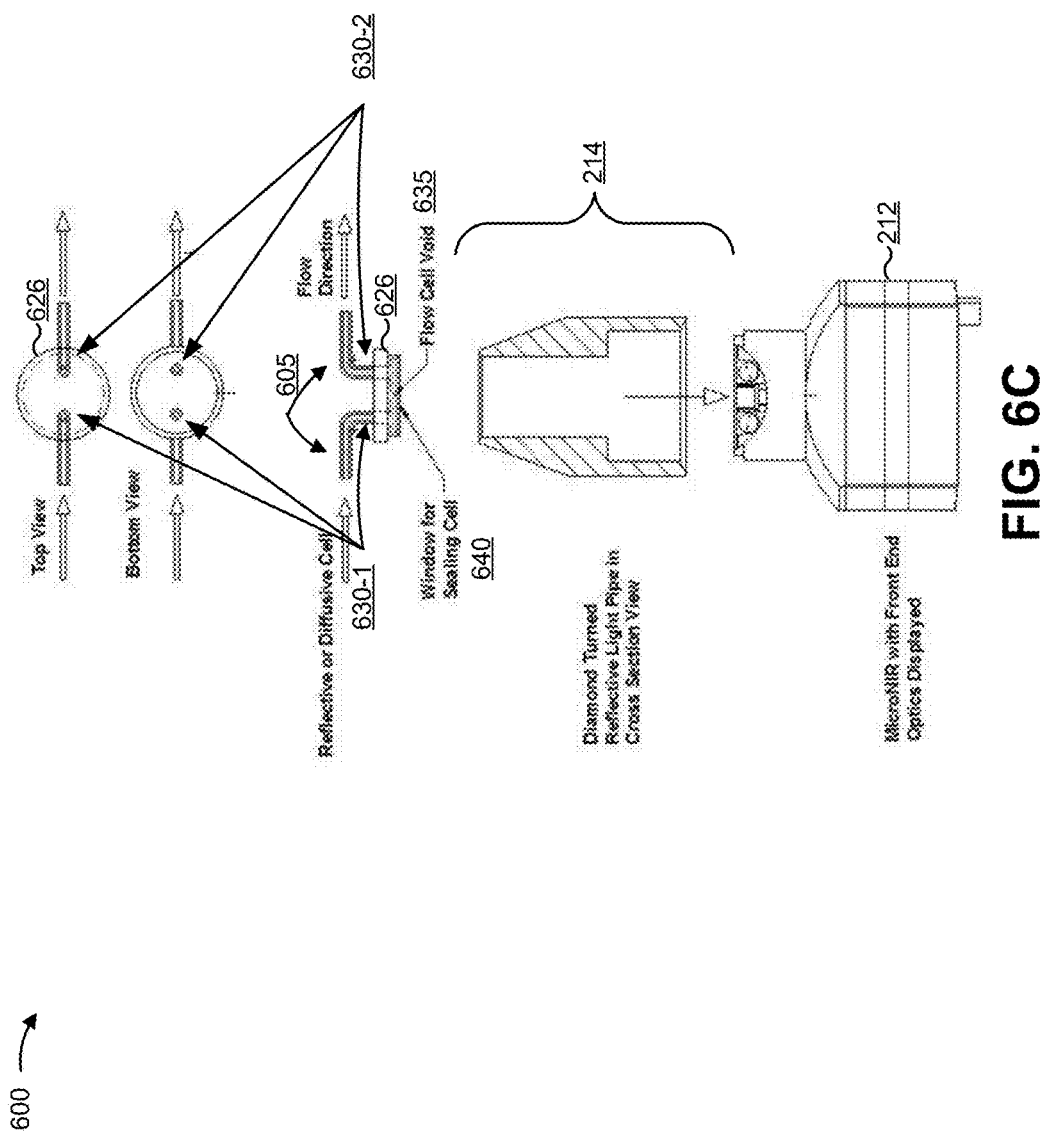

FIGS. 6A-6C are diagrams of an example implementation 600 relating to example process 400 shown in FIG. 4. FIGS. 6A-6C show an example of another spectroscopic assembly 210 to perform raw material identification.

Figure 7A:
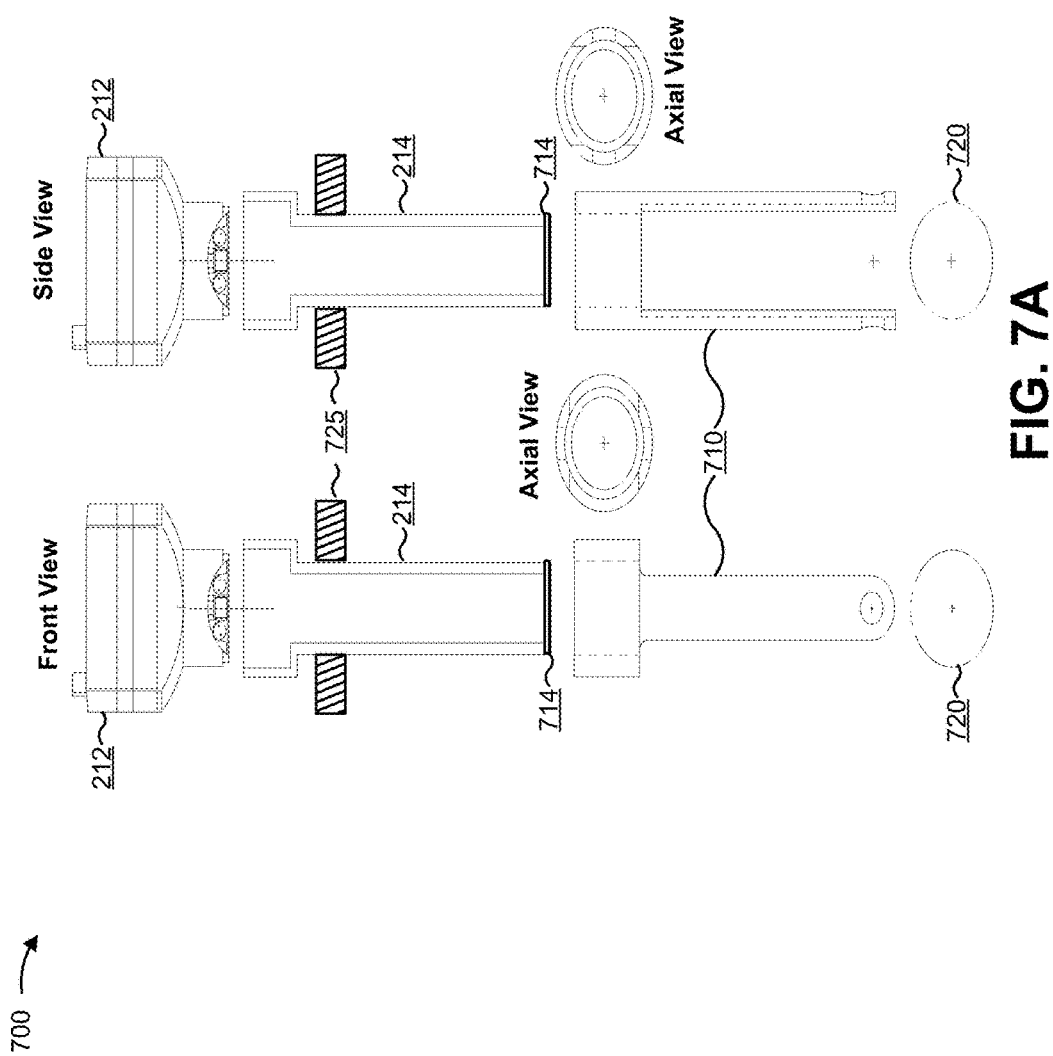

FIGS. 7A and 7B are diagrams of an example implementation 700 relating to example process 400 shown in FIG. 4. FIGS. 7A and 7B show an example of yet another spectroscopic assembly 210 to perform raw material identification.

As shown in FIG. 4, process 400 may include aligning a sample with a spectrometer using a light pipe (block 410). For example, spectrometer 212 may be aligned with the sample using light pipe 214. In some implementations, spectrometer 212 may be separated from the sample by a threshold distance using light pipe 214 (e.g., a distance associated with permitting a spectroscopic measurement to be performed). For example, light pipe 214 may enclose a portion of spectrometer 212 in a first portion of a cavity, and may enclose a sample in a second portion of a cavity. In this case, an end of spectrometer 212 may be separated from an end of the sample (e.g., a pill in a blister pack) by a particular distance, such as approximately 2 millimeters (mm) to approximately 10 mm, approximately 3 mm to approximately 5 mm, or the like. In some implementations, the particular distance may be a hollow cavity, a solid cavity (e.g., an optically transmissive material cavity), or the like. In some implementations, light pipe 214 may include a spacer that permits a separation between spectrometer 212 and the sample to be adjusted. For example, as shown in FIG. 5A, spacer structure 505 (e.g., a ring spacer or a translucent disc spacer) of light pipe 214 may be utilized to increase the separation between spectrometer 212 and the sample relative to attaching spectrometer 212 to light pipe 214 without utilizing spacer structure 505. In another example, light pipe 214 may include a variable length portion, such as a telescoping portion, an extension tube portion (e.g., a detachable portion that permits light pipe 214 to be extended by attaching a body piece or contracted by removing a body piece), or the like. In some implementations, light pipe 214 may utilize a spacer to alter a position of spectrometer 212 relative to light pipe 214 or a position of sample 515 relative to light pipe 214.

In some implementations, light pipe 214 may align the sample with spectrometer 212 based on the sample being inserted into a cavity of light pipe 214. For example, when a surface of light pipe 214 is positioned contiguous to a base surface of a blister pack enclosing the sample (e.g., the blister pack may enclose the sample in a translucent plastic window extending from the base surface toward light pipe 214), a sample enclosure of the blister pack (and the sample) may extend into light pipe 214. In some implementations, light pipe 214 may align another type of sample with spectrometer 212. For example, light pipe 214 may align an item that is not enclosed in a blister pack, such as a pill, a grain, a seed, or the like. In this case, light pipe 214 may be positioned contiguous to a surface upon which the item is positioned.

Additionally, or alternatively, light pipe 214 may align another type of sample with spectrometer 212. For example, as shown in FIGS. 5A and 5B, a sample tube 515 (e.g., a vial, a test tube, or a cuvette) containing a sample (e.g., a liquid sample or a solvent sample) may be inserted into an opening of light pipe 214 (e.g., through cap 520 that provides a substantial seal around the sample tube) to align the sample with spectrometer 212. In this way, light pipe 214 permits spectroscopic measurements to be performed on a liquid or solvent sample in a sample tube. A substantial seal may refer to a seal that prevents a threshold percentage of light from passing through an opening.

Similarly, as shown in FIGS. 6A and 6B, a sample pipe 605 (e.g., a glass pipe or a plastic pipe that is transparent in a spectral range corresponding to a spectroscopic measurement, such as a borosilicate glass pipe, a fused silica glass pipe, a plastic pipe, or the like) may direct a sample (e.g., a liquid sample or a solvent sample) through a cavity of light pipe 214 (e.g., a hollow cavity, a solid cavity (e.g., that includes sample pipe 605), or the like. In this case, as shown in FIG. 6B, light pipe 214 includes openings 620-1 and 620-2 through which sample pipe 605 is directed. Openings 620-1 and 620-2 may include one or more seals to ensure a substantial seal around sample pipe 605 to cause the liquid or solvent sample to be aligned with spectrometer 212. In this way, light pipe 214 permits spectroscopy to be performed on a liquid sample or a solvent sample directed through a sample pipe. In some implementations, light pipe 214 may utilize a sample pipe 605 associated with a non-circular cross section, such as a sample pipe 605 with an oval cross section, rectangular cross section, or the like. In some implementations, light pipe 214 may utilize a sample pipe 605 with a partially non-transparent portion, such as a sample pipe 605 with a transparent lower portion (e.g., relatively closer to spectrometer 212) and a frosted upper portion (e.g., relatively farther from spectrometer 212).

In another example, as shown in FIG. 6C, sample pipe 605 may be directed into cap 626 of light pipe 214 via opening 630-1. Cap 626 may include a flow cell void 635 through which the liquid sample or solvent sample may be directed toward opening 630-2 via which the liquid sample or solvent sample exits flow cell void 635 into sample pipe 605. Cap 626 may include a window 640 that provides a seal of flow cell void 635 and permits light to be directed from spectrometer 212 to the liquid sample or solvent sample (e.g., via light pipe 214). Cap 626 may include a reflective surface that causes light directed to the liquid sample or solvent sample to be reflected toward spectrometer 212 (e.g., via light pipe 214). In this way, spectroscopic assembly 210 may perform rapid testing of liquid samples or solvent samples by being attached to one or more caps 626 through which the liquid samples or the solvent samples are directed. Moreover, based on utilizing flow cell void 635 as a cavity through which the liquid sample or the solvent sample is directed, a greater cross-sectional area of the liquid sample or the solvent sample may be exposed to light relative to a circular cross section of sample pie 605, resulting in a more accurate spectroscopic measurement.

Additionally, or alternatively, light pipe 214 may align a sample with spectrometer 212 based on a portion of light pipe 214 being inserted into a container of the sample. For example, as shown in FIGS. 7A and 7B, light pipe 214 may include a dip probe 710 (e.g., a Delrin® based structure). Dip probe 710 may be inserted into a sample container 711, thereby causing a particular amount of sample 712 (e.g., a liquid or solvent sample) to be positioned at sample space 713 in alignment with spectrometer 212, without spectrometer 212 being exposed to touching sample 712. In this case, light pipe 214 may include window 714 to protect spectrometer 212 from touching, or otherwise being exposed to, sample 712.

In some implementations, light pipe 214 may cause the sample to be enclosed when light pipe 214 aligns the sample with spectrometer 212. For example, the sample may be enclosed by a surface upon which the sample is positioned (e.g., a base surface of a blister pack), an interior surface of the cavity of light pipe 214, and a window of light pipe 214 positioned between the sample and spectrometer 212. In this case, the window may ensure that a sensor of spectrometer 212 is protected from being exposed to particulate matter or the like, thereby reducing a maintenance requirement associated with spectrometer 212. In another example, the window may include a solid cavity portion (e.g., an optically transmissive solid cavity portion). Additionally, or alternatively, the sample may be enclosed by the surface upon which the sample is positioned, the interior surface of the cavity of light pipe 214, and spectrometer 212 (e.g., when light pipe 214 does not include a window).

In some implementations, light pipe 214 may be particularly shaped to cause the sample to be aligned with spectrometer 212. For example, when the sample is at a position to which spectrometer 212 cannot be aligned axially, a particular light pipe, which includes an angled portion of the cavity, a fiber optic portion of the cavity (e.g., a fiber optic structure inside the cavity, a fiber optic structure that forms a solid cavity, etc.), or the like, may be selected. In this way, light pipe 214 may cause a spectrometer 212 to be aligned, reflectively, with the sample. In some implementations, light pipe 214 may be particularly shaped to receive a sample tube, such as a cuvette or the like, to align the sample with the spectrometer. For example, as shown in FIG. 5A, light pipe 214 may include cap 520 (e.g., an optically reflective cap, an optically diffusive cap, or an optically absorptive cap) that includes an opening 525 to receive sample tube 515. In this case, as shown in FIG. 5B, sample tube 515 may be inserted into cap 520 to cause the sample to extend into a cavity 530 of light pipe 214 and toward spectrometer 212.

In some implementations, light pipe 214 may align spectrometer 212 with a surface of an optical diffuser or an optical reflector. For example, as shown in FIGS. 5A and 5B, cap 535 (e.g., a Teflon core optical reflector cap, such as a diffusive reflector, a specular reflector, or the like) may be inserted into sample tube 515 to cause reflection of light toward spectrometer 212. In this case, as shown in FIG. 5B, the cap may be selected with a particular size to cause an ideal amount of a sample to be included in sample tube 515 and maintain a threshold thickness 540 of the sample. Similarly, as shown in FIGS. 6A and 6B, cap 625 (e.g., a Teflon optical diffusor cap or an optical reflector cap, such as a diffusive reflector, a specular reflector, or the like) may be positioned to enclose a section of sample pipe 605, through which a sample is directed, within light pipe 214. Additionally, or alternatively, light pipe 214 may be attached to a structure supporting a reflective or diffusive surface. For example, as shown in FIGS. 7A and 7B, surface 720 (e.g., an optically diffusive surface or an optically reflective surface, such as Teflon sphere, a Teflon cylinder, a Teflon rectangular prism, or the like) may be supported in an alignment with spectrometer 212 and light pipe 214 by dip probe 710 to cause light directed toward sample 712 to be diffused from or directed toward spectrometer 212. In this case, dip probe 710 may support surface 720 via a force fit technique or the like.

In some implementations, light pipe 214 may include a spacer to adjust a position of the surface with the optical diffuser or reflector. For example, as shown in FIGS. 7A and 7B, spacer ring 725 may be included with or attached to light pipe 214 and/or dip probe 710 to cause dip probe 710 to extend surface 720 farther from light pipe 214 (and spectrometer 212) than if spacer ring 725 was not included with or attached to light pipe 214 and/or dip probe 710. Similarly, a cap (e.g., an optical reflector or an optical diffusor) may be associated with a spacer that may be utilized to alter a distance of the cap to a sample or to spectrometer 212.

As further shown in FIG. 4, process 400 may include performing a set of spectroscopic measurements of the sample based on aligning the sample with the spectrometer using the light pipe (block 420). For example, spectrometer 212 may perform the set of spectroscopic measurements of the sample based on aligning the sample with spectrometer 212 using light pipe 214. In some implementations, spectrometer 212 may cause light to be directed toward the sample via light pipe 214. For example, spectrometer 212 may generate light to perform the set of spectroscopic measurements, and the light may be directed toward the sample based on aligning the sample with spectrometer 212.

Additionally, or alternatively, spectrometer 212 may direct the light toward the sample based on a reflective surface of light pipe 214. For example, a cavity of light pipe 214 may include a reflective surface (e.g., an anodized aluminum surface) to cause light to be directed toward the sample. Additionally, or alternatively, light pipe 214 may include an aluminized Mylar foil cylinder inserted into the cavity of light pipe 214, which may cause light to be reflected toward the sample. Additionally, or alternatively, light pipe 214 may include an angled portion, a fiber optic portion, a solid portion, or the like that is associated with directing light between spectrometer 212 and the sample. In this way, light pipe 214 may increase an amount of light that is directed toward a sample relative to light diverging without use of light pipe 214, thereby improving an accuracy of a spectroscopic measurement. Moreover, light pipe 214 may reduce an amount of ambient light that illuminates the sample relative to the sample being exposed, thereby improving an accuracy of a spectroscopic measurement. Furthermore, light pipe 214 may ensure a relatively uniform illumination of the sample relative to diverging light and/or ambient light associated without use of light pipe 214.

In some implementations, spectrometer 212 may receive light reflected from the sample. For example, based on spectrometer 212 directing light toward the sample through light pipe 214, reflected light may be directed toward spectrometer 212 through light pipe 214. Based on light pipe 214 and a surface of a blister pack enclosing the sample, light pipe 214 reduces a dispersion of reflected light relative to an exposed sample without light pipe 214. Similarly, light pipe 214 reduces an amount of ambient light that is directed toward spectrometer 212 relative to an exposed sample without light pipe 214.

In some implementations, spectrometer 212 may perform one or more spectroscopic measurements on light received by spectrometer 212. For example, after spectrometer 212 generates light that is directed between the sample and spectrometer 212 by light pipe 214, spectrometer 212 may perform one or more measurements of the light. In this way, spectrometer 212 performs a spectroscopic measurement of a sample using light pipe 214.

As further shown in FIG. 4, process 400 may include determining a set of components of the sample based on the set of spectroscopic measurements (block 430). For example, spectrometer 212 may determine the set of components of the sample based on the set of spectroscopic measurements. In some implementations, spectrometer 212 may provide information identifying the set of spectroscopic measurements to server device 220 to cause server device 220 to determine the set of components. In some implementations, spectrometer 212 may utilize a particular classification technique to determine the set of components. For example, spectrometer 212 may utilize a support vector machine (SVM) classification technique to identify one or more components of the sample.

In some implementations, spectrometer 212 may determine the set of components based on the set of spectroscopic measurements and a set of calibration measurements. For example, spectrometer 212 may perform a calibration of spectrometer 212 by obtaining a set of calibration measurements, such as performing a calibration measurement without a sample enclosed by light pipe 214, with only an optically diffuse cap or an optically reflective cap aligned with light pipe 214, without a cap aligned with light pipe 214, or the like. In this case, spectrometer 212 may utilize a comparison technique to compare the set of spectroscopic measurements with the set of calibration measurements to determine one or more components of the sample.

In some implementations, spectrometer 212 may provide information identifying the set of components of the sample. For example, spectrometer 212 may provide information identifying the set of components of the sample via a user interface of spectrometer 212. Additionally, or alternatively, spectrometer 212 may provide information identifying the set of components for display via another device, for storage, or the like. In some implementations, spectrometer 212 may provide an alert or a notification based on the set of components. For example, when the set of components does not match an expected set of components, spectrometer 212 may provide an alert (e.g., for display to an inspector or to cause a pipe conveying a sample to be disabled).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As indicated above, FIGS. 5A and 5B are provided merely as an example. Other examples are possible and may differ from what was described with regard to FIGS. 5A and 5B.

As indicated above, FIGS. 6A-6C are provided merely as an example. Other examples are possible and may differ from what was described with regard to FIGS. 6A-6C.

As indicated above, FIGS. 7A and 7B are provided merely as an example. Other examples are possible and may differ from what was described with regard to FIGS. 7A and 7B.

Figure 8A:
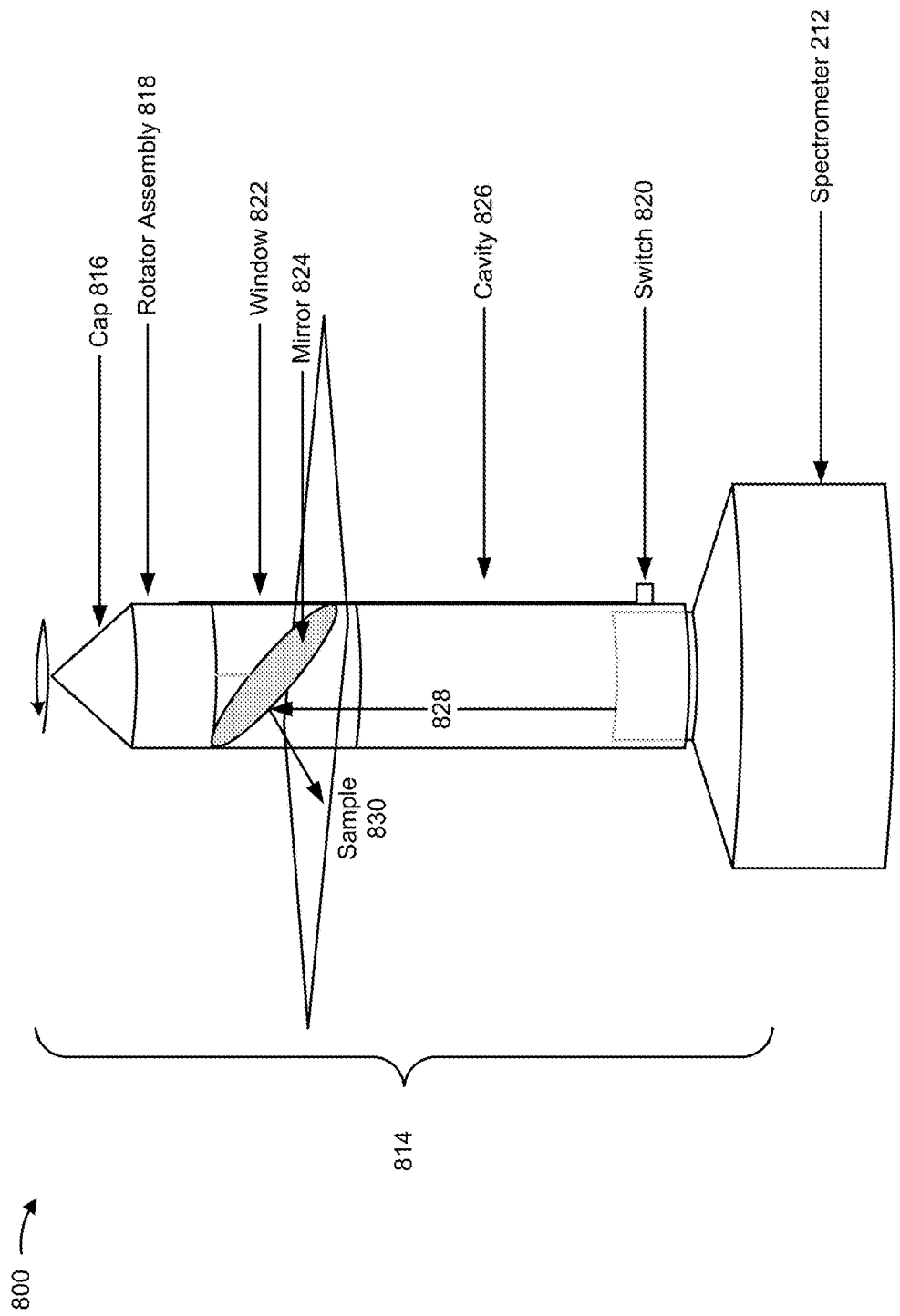
FIGS. 8A-8C are diagrams of yet another example implementation relating to the example process shown in FIG. 4.
Figure 8B:
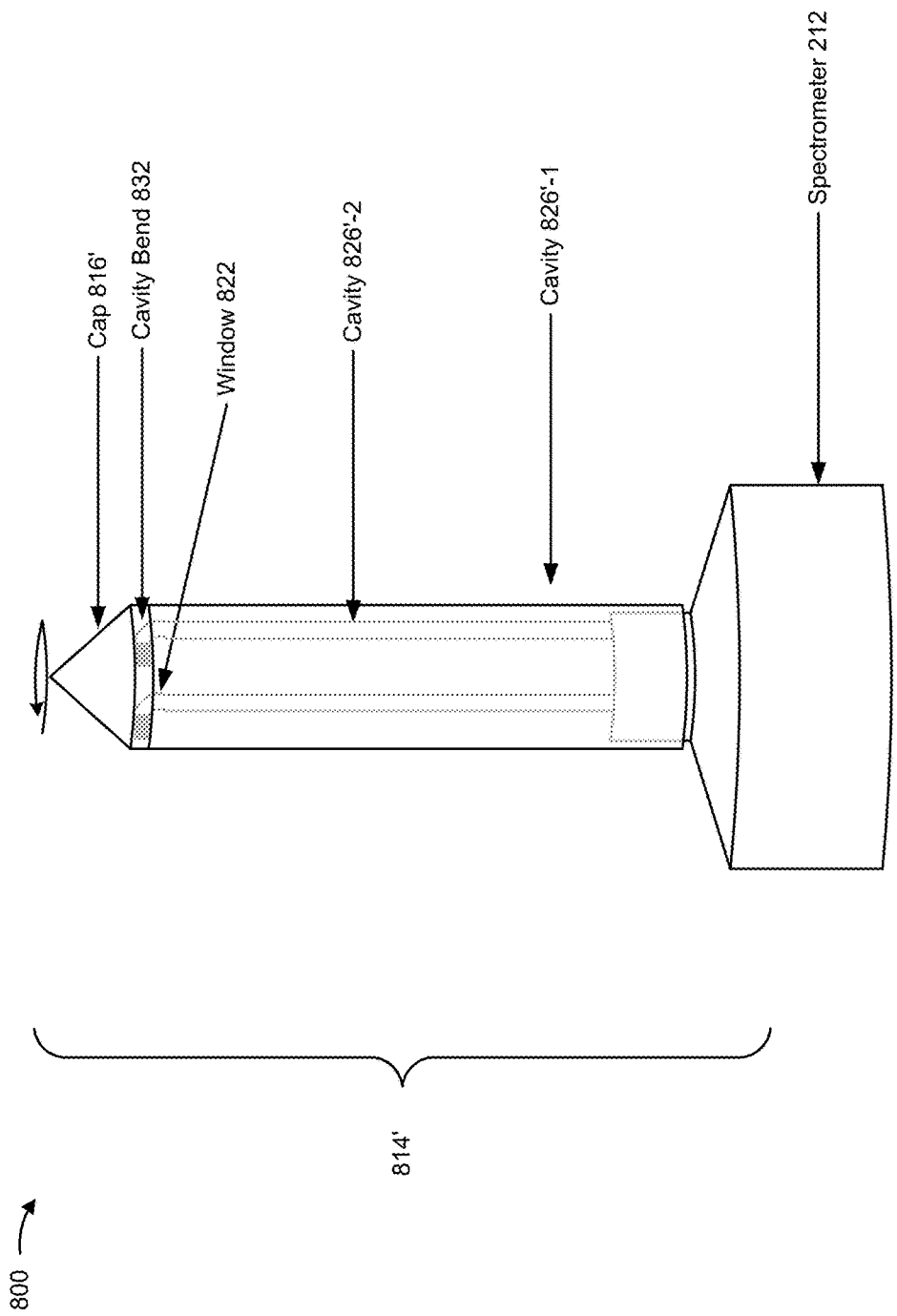
Figure 8C:
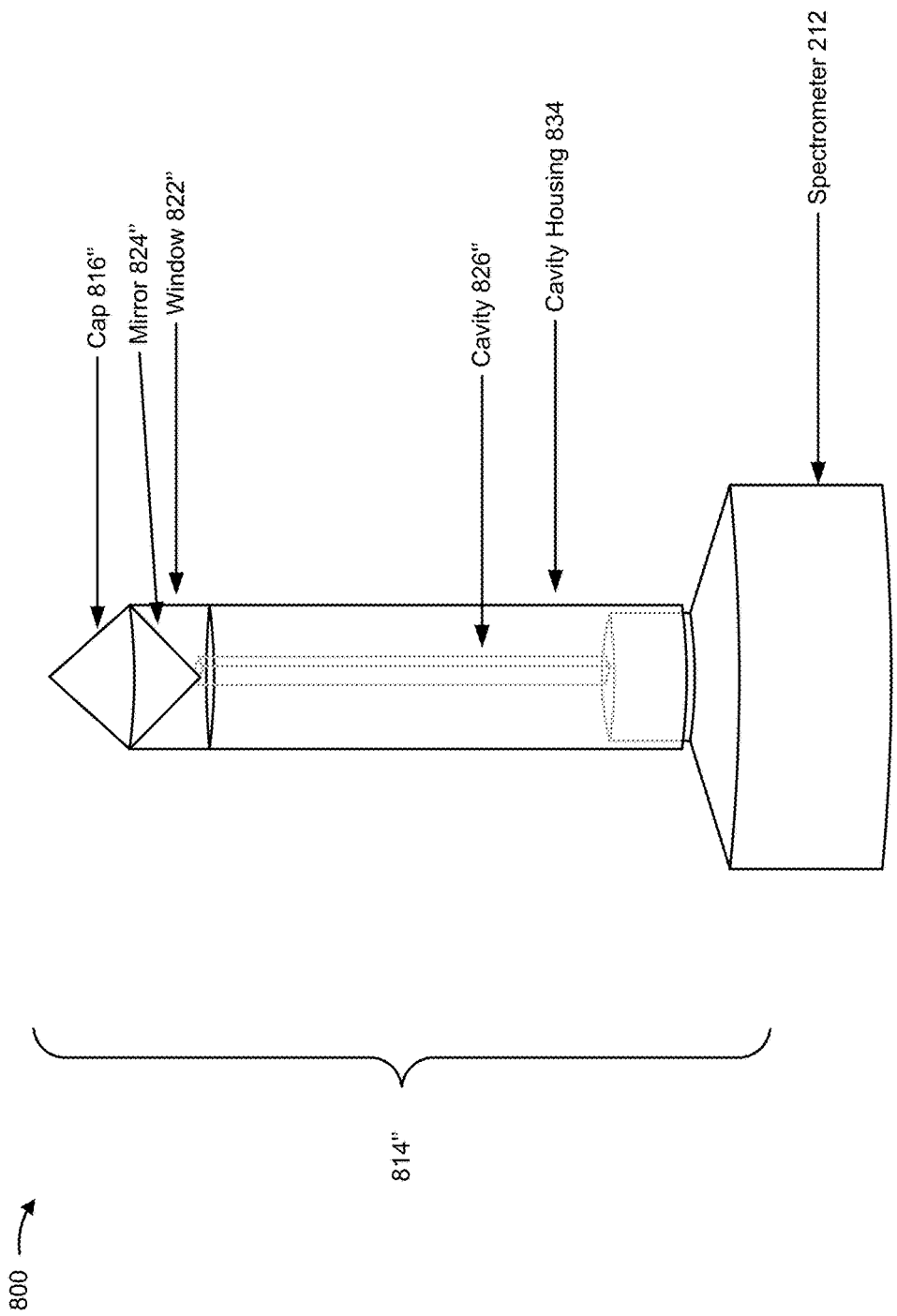

FIGS. 8A-8C are diagrams of an example implementation 800 relating to example process 400 shown in FIG. 4. FIGS. 8A-8C show an example of another spectroscopic assembly to perform raw material identification.

As shown in FIG. 8A, a light pipe 214 is affixed to a spectrometer 212. In some implementations, light pipe 814 corresponds to light pipe 214. Light pipe 814 includes a cap 816, a rotator assembly 818, a switch 820, a window 822, a mirror 824, and a cavity 826. In some implementations, cap 816 may be a pointed cap to enable light pipe 814 to be inserted into a sample, such as a soil sample in the ground. Additionally, or alternatively, cap 816 may be a screw-form cap or another shape of cap to enable insertion into a sample. In some implementations, rotator assembly 818 may include a motor, a battery, or the like. In some implementations switch 820 may include a switch for operating the motor of rotator assembly 818. For example, based on operating switch 820 a speed of rotation may be altered. Additionally, or alternatively, based on operating switch 820, an angle of reflection associated with mirror 824 may be altered. In some implementations, a controller (e.g., of spectrometer 212) may automatically operate switch 820 to control the motor of rotator assembly 818. In this way, mirror 824 may be rotated to permit a 360 degree spectroscopic sample to be obtained by spectrometer 212.

In some implementations, window 822 may include a transparent window surrounding mirror 824 and axially aligned to cavity 826. In some implementations, mirror 824 may include a reflective surface, such as a metal-based mirror surface, a glass based mirror surface, or the like. In some implementations, window 822 may include a glass window, a plastic window, or the like, and may permit light to be directed to a sample located outside of light pipe 814 without the sample being in contact with mirror 824. In some implementations, cavity 826 may be a particular axial length to enable light pipe 814 to be inserted into a sample to a selected depth. As shown by reference number 828, light may be directed by light pipe 814 from spectrometer 212 through cavity 826 (e.g., a reflectively walled cavity). The light may be reflected by mirror 824 and through window 822 to direct the light to sample 830. In this case, the light may be reflected by sample 830 through window 822, to mirror 824, to cavity 826, and to spectrometer 212 to permit spectrometer 212 to perform a spectroscopic measurement. During operation, rotator assembly 818 rotates mirror 824 to permit light to be directed toward and reflected from different portions of a sample into which light pipe 814 is inserted.

In this way, light pipe 814 uses mirror 824 and rotator assembly 818 to permit rotational scanning of a sample, thereby enabling multiple portions of the sample to be measured. For example, spectrometer 212 may use light pipe 814 to obtain data regarding spectral variation of a sample, and may determine an average spectrum for the sample to perform RMID on the sample.

As shown in FIG. 8B, a similar light pipe 814' may be used to perform rotational scanning of a sample without rotator assembly 818. Light pipe 814' may include a cap 816', a window 822', a cavity 826'-1, a cavity 826'-2, and a cavity bend 832. In some implementations, cavity 826'-1 may include a cylindrical cavity to receive spectrometer 212. In some implementations, cavity 826'-1 may be a different cross-sectional shape to correspond to a cross-sectional shape of an output of spectrometer 212. In some implementations, cavity 826'-2 may include a rectangular cross-section portion to direct light to cavity bend 832. In some implementations, cavity bend 832 may redirect light from spectrometer 212 to window 822'. For example, light may be directed perpendicular to cavity 826'-2 by cavity bend 832 and toward a sample aligned to window 822'. In this case, light pipe 814' may be manually turned to alter an orientation of window 822', thereby enabling rotational scanning without rotator assembly 818. Additionally, or alternatively, an external device, such as a rotator assembly of spectrometer 212 may be used to rotate light pipe 814'.

As shown in FIG. 8C, a similar light pipe 814" may be used to perform rotational scanning of a sample without rotation of light pipe 814" or a portion thereof. Light pipe 814" may include a cap 816", a window 822", a mirror 824", a cavity 826", and a cavity housing 834. Cavity 826" may located within cavity housing 834. In this case, light may be directed from spectrometer 212 to mirror 824" via cavity 826". In some implementations, mirror 824" may be a convex conical-shaped mirror to disperse the light in, for example, 360 degrees of orientation through window 822". In other words, light may be directed to a sample surrounding light pipe 814" to perform scanning of each direction concurrently. The light may be reflected by a sample aligned to window 822" toward mirror 824", which may direct the light through cavity 826" toward spectrometer 212. In this way, spectrometer 212 may obtain an average spectrum of a sample surrounding light pipe 814" (e.g., aligned to window 822"), without light pipe 814" being rotated or a portion of light pipe 814" being rotated.

In this way, a spectroscopic sample of a heterogeneous material may be obtained using light pipe 814, 814', or 814", thereby reducing a time to obtain the spectroscopic sample relative to moving a spectrometer to different locations in a sample area. Based on reducing the time to obtain the spectroscopic sample, a power utilization may be reduced. Moreover, based on obviating a need to move the spectroscopic sample, an accuracy and a reproducibility of spectroscopic measurements may be improved relative to moving the spectrometer to different locations in a sample area.

As indicated above, FIGS. 8A-8C are provided merely as an example. Other examples are possible and may differ from what was described with regard to FIGS. 8A-8C.

Figure 9A:
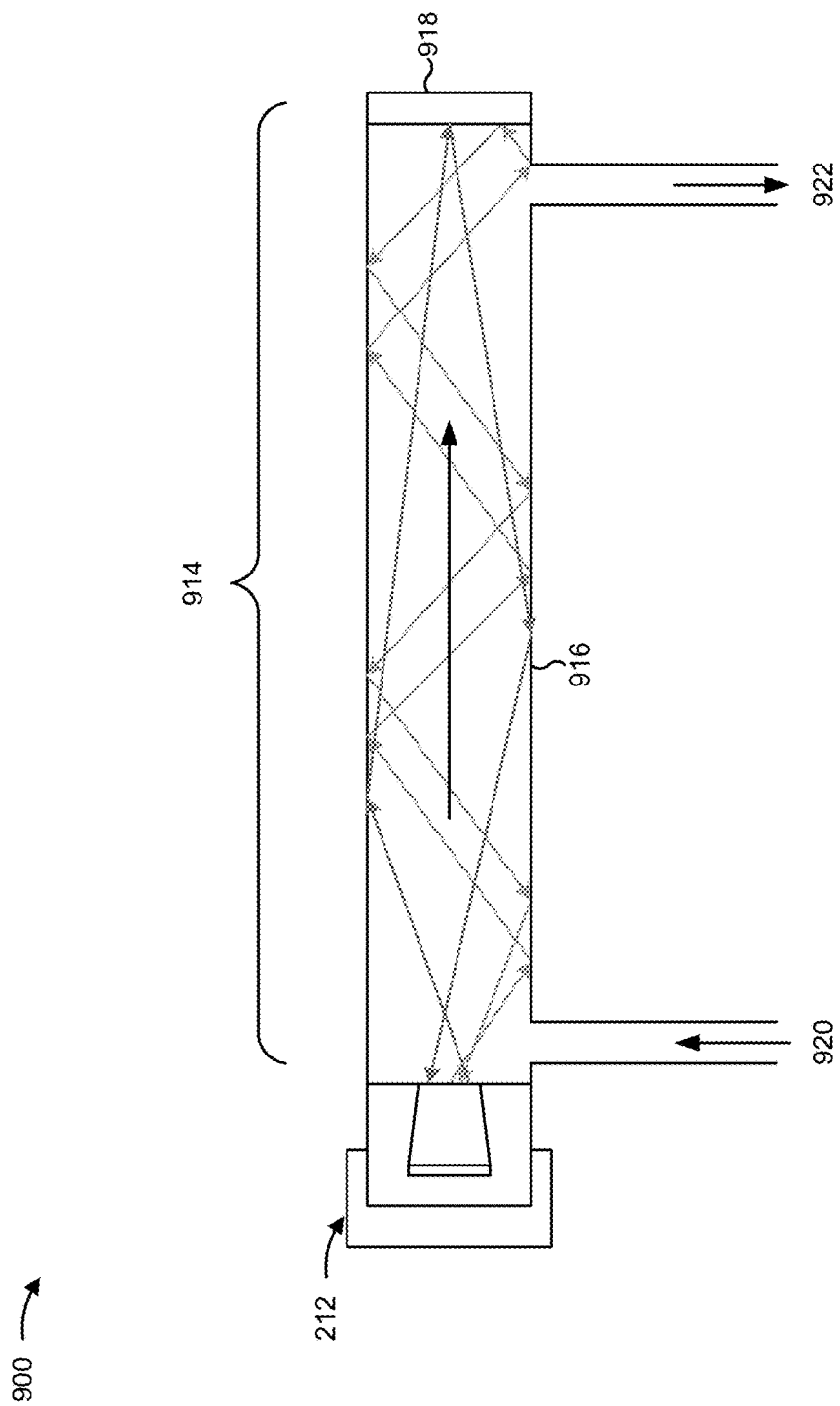
FIGS. 9A and 9B are diagrams of yet another example implementation relating to the example process shown in FIG. 4.
Figure 9B:
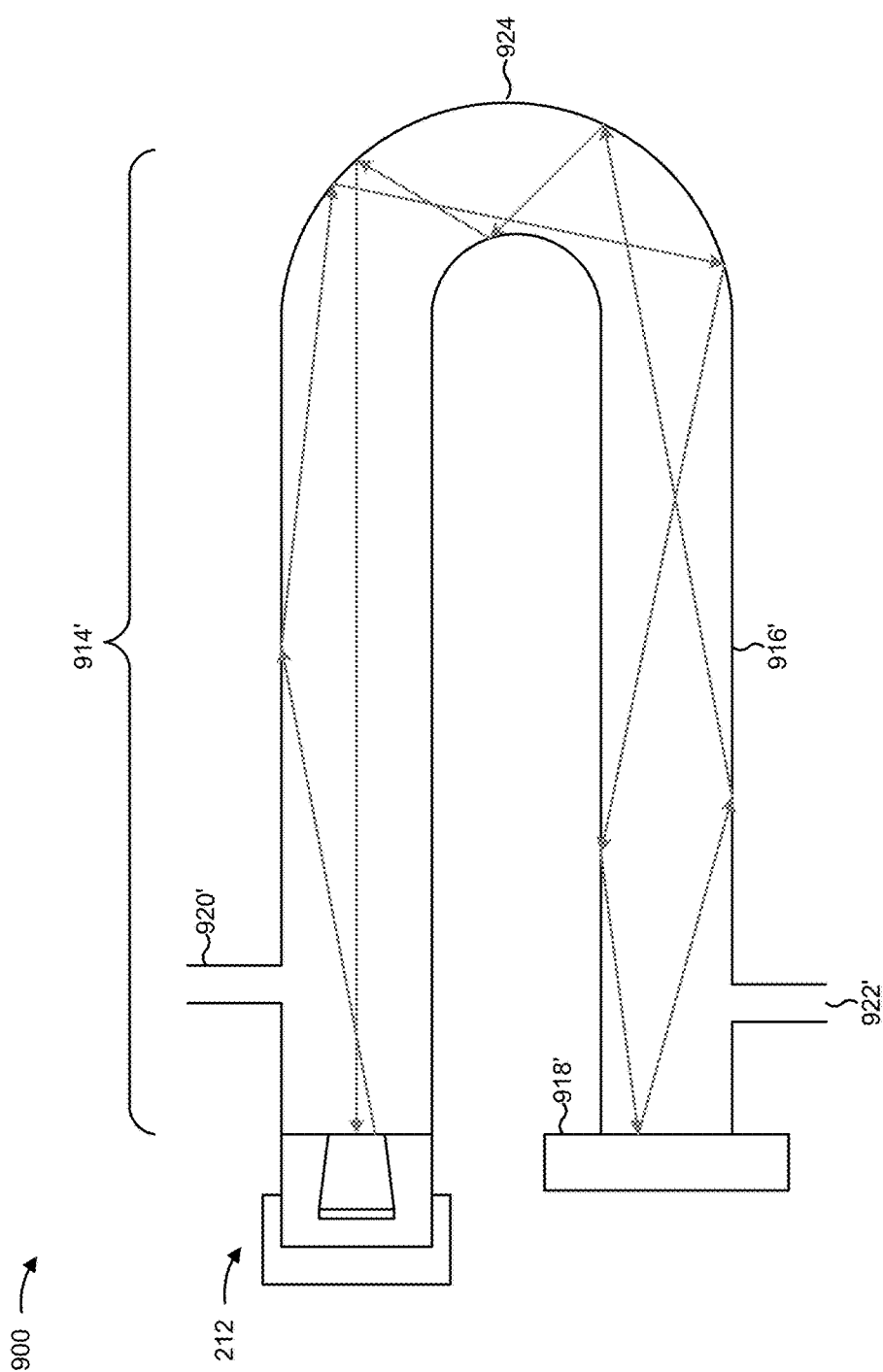

FIGS. 9A and 9B are diagrams of an example implementation 900 relating to example process 400 shown in FIG. 4. FIGS. 9A and 9B show an example of another spectroscopic assembly 210 to perform raw material identification.

As shown in FIG. 9A, a light pipe 914 may couple to a spectrometer 212 to enable spectroscopic measurements of a sample (e.g., a gas sample, a liquid sample, etc.). Light pipe 914 may include a cavity 916, a cap 918, an input 920, and an output 922. For example, a liquid or gas may be directed into the input 920 (e.g., a first opening in cavity 916 to receive the liquid or gas), and may be directed through cavity 916 (e.g., a reflectively surfaced hollow light cavity) to output 922 (e.g., a second opening in cavity 916 to expel the liquid or gas). In this case, spectrometer 212 may perform a spectroscopic measurement of the liquid or gas by emitting light into cavity 916. For example, light pipe 914 may receive light from spectrometer 212, and direct the light toward cap 918. In this case, the light may be reflected by cap 918 (e.g., a mirror reflector) toward spectrometer 212 (e.g., via cavity 916). In some implementations, cavity 916 may be a threshold axial length to permit a threshold absorption, by a sample inside cavity 916, of light emitted by spectrometer 212, thereby enabling a spectroscopic measurement of the sample.

As shown in FIG. 9B, a similar light pipe 914' may include a cavity 916', a cap 918', an input 920', and an output 922'. In this case, cavity 916' is associated with a bend 924 that enables an increased path length for light emitted from spectrometer 212 toward cap 918', thereby increasing absorption of the light by a sample inside cavity 916', without cavity 916' extending a threshold lateral distance from spectrometer 212. In this way, light pipe 914' may be configured in a compact package to enable a spectroscopic measurement of a sample.

In this way, light pipe 914 enables spectrometer 212 to perform a spectroscopic measurement of, for example, a gas that is contained inside light pipe 914.

As indicated above, FIGS. 9A and 9B are provided merely as an example. Other examples are possible and may differ from what was described with regard to FIGS. 9A and 9B.

Figure 10:
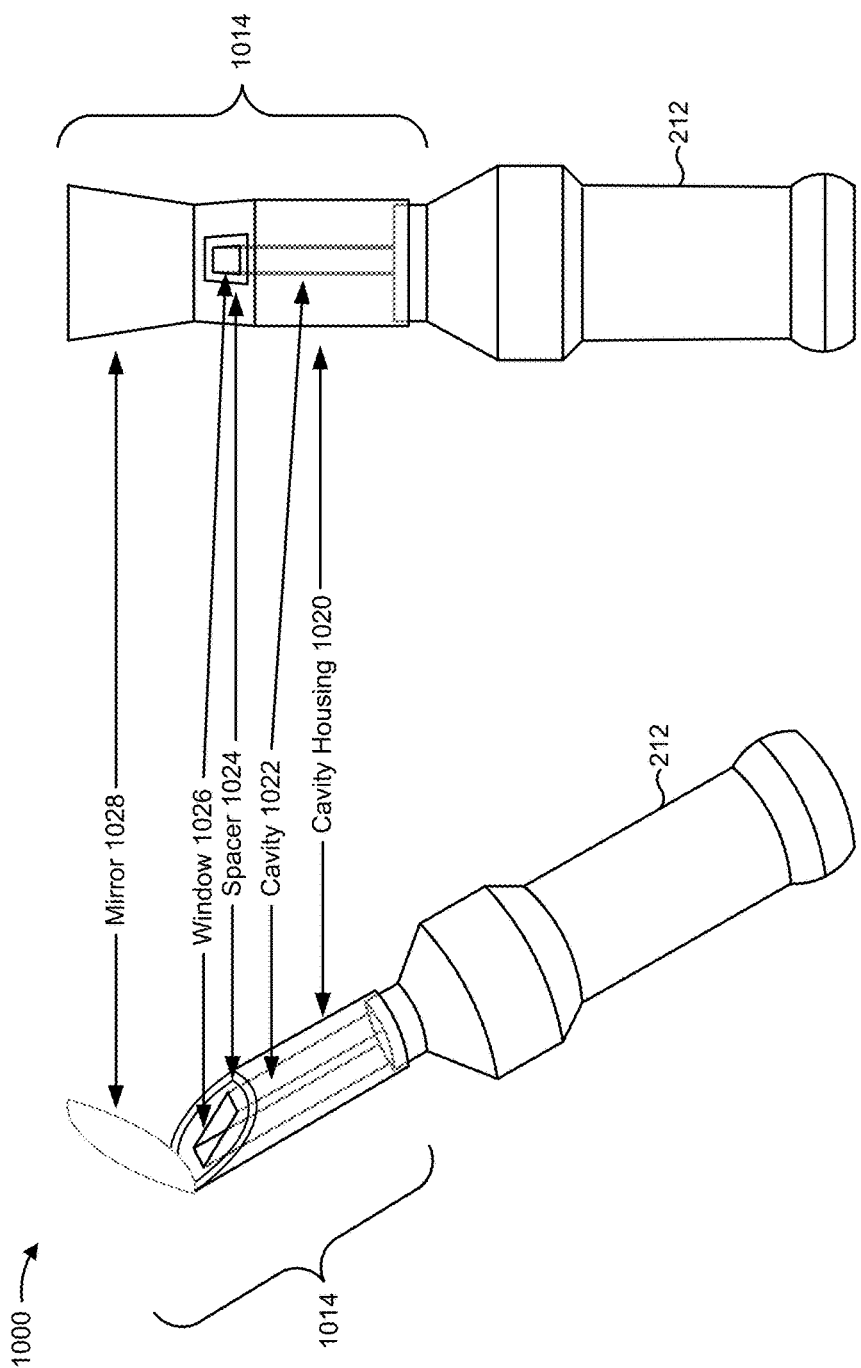
FIG. 10 is a diagram of yet another example implementation relating to the example process shown in FIG. 4.

FIG. 10 is a diagram of an example implementation 1000 relating to example process 400 shown in FIG. 4. FIG. 10 shows an example of another spectroscopic assembly 210 to perform raw material identification.

As shown in FIG. 10, a light pipe 1014 may couple to a spectrometer 212 to enable spectroscopic measurements of a sample. Light pipe 1014 may include a cavity housing 1020, a cavity 1022, a spacer 1024, a window 1026, and a mirror 1028. For example, light may be directed from spectrometer 212 via cavity 1022 (e.g., a hollow cavity, an optically transmissive solid cavity, etc.) and toward a sample (e.g., a liquid sample) positioned on window 1026 (e.g., a sapphire window, a glass window, a plastic window, or another type of optically transmissive window). Mirror 1028 may include another window (e.g., another sapphire window, glass window, plastic window, or other optically transmissive window) and a reflector (e.g., a diffusive reflector associated with a threshold reflectance, such as 95% reflectance, 99% reflectance, or the like), and may be attached to a hinge to permit mirror 1028 to be repositioned between an open position and a closed position. In the open position, as shown, the sample may be positioned (e.g., by a user) between window 1026 and mirror 1028. In the closed position, spacer 1024, window 1026, and mirror 1028 may enclose the sample, and spacer 1024 may separate mirror 1028 from window 1026 by a threshold separation to ensure a threshold thickness of the sample for measurement. The light may be reflected by mirror 1028, after being passed through the sample, back toward spectrometer 212 (e.g., through window 1026 and cavity 1022) for measurement.

In some implementations, light may be directed to mirror 1028 and back to spectrometer 212 without a sample being positioned between window 1026 and mirror 1028. In this case, spectrometer 212 may perform a baseline measurement associated with mirror 1028. In some implementations, a sensor system may be included in a spectroscopic assembly 210 that includes spectrometer 212 and light pipe 1014. For example, a temperature sensor and/or a thermos-electric cooler/heater may be attached within a threshold proximity to window 1026. In this way, a temperature measurement of the sample may be performed, a temperature of the sample may be controlled, or the like. In some implementations, spacer 1024 may be a repositionable spacer (e.g., a ring-shaped spacer or another shaped spacer extending along the optical axis of light pipe 1024 from window 1026 toward mirror 1028) to permit a separation between window 1026 and mirror 1028 to be adjusted, thereby controlling a sample thickness of a sample positioned between window 1026 and mirror 1028. In some implementations, window 1026 and mirror 1028 may be positioned at an angle to the optical axis of light pipe 1014, as shown, thereby increasing a sampling area of a sample relative to a positioning in alignment with the optical axis, reducing specular components relating to reflected light from mirror 1028, and providing an ergonomic grip design for a user.

In this way, light pipe 1014 may obviate a need for a vial, a cuvette, or the like to perform spectroscopic measurements of samples (e.g., liquid samples), thereby reducing a cost of spectroscopy. Moreover, light pipe 1014 improves an accuracy of spectroscopy by ensuring a uniform thickness and positioning of samples for measurement. Furthermore, based on obviating a need for a vial or cuvette, an accuracy of spectroscopic measurements is improved based on improving a uniformity of sample (e.g., by positioning the sample directly on light pipe 1014 rather than one or more vials of the sample). Furthermore, based on utilizing a set of, for example, flat windows to enclose the sample (e.g., window 1026 and a window of mirror 1028), a difficulty of clean up may be reduced relative to clean up of a vial or cuvette.

As indicated above, FIG. 10 is provided merely as an example. Other examples are possible and may differ from what was described with regard to FIG. 10.

In this way, spectroscopic assembly 210 utilizes light pipe 214 to increase an amount of light that is directed between spectrometer 212 and a sample (e.g., in both the transmission direction toward the sample and the reception direction toward spectrometer 212) and reduce an amount of ambient light to which spectrometer 212 and the sample are exposed relative to utilizing spectrometer 212 without light pipe 214, thereby improving an accuracy of a spectroscopic measurement. Moreover, based on including an opening in light pipe 214 into which a sample may be positioned, light pipe 214 permits rapid alignment of the sample and spectrometer 212 at a particular separation selected to improve accuracy of one or more spectroscopic measurements.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A spectroscopic assembly, comprising:
    a spectrometer,
        the spectrometer including an illumination source to generate a light to illuminate a sample,
        the spectrometer including a sensor to obtain a spectroscopic measurement based on light, reflected by the sample, from the light illuminating the sample; and
    a light pipe to transfer the light reflected from the sample,
        the light pipe including:
            a first portion that includes a first opening to receive the spectrometer,
            a second portion that includes a second opening to receive the sample, such that the sample is enclosed by the light pipe and a base surface when the sample is received at the second opening,
                a first diameter of the first portion being different from a second diameter of the second portion,
            a mounting surface disposed between the first portion and the second portion, and
            a glass window contiguous to the mounting surface, the light pipe being associated with aligning the illumination source and the sensor with the sample.

2. The spectroscopic assembly of claim 1, where the light pipe further comprises:

a cavity extending axially from the first opening to the second opening to receive the spectrometer and the sample and to align the spectrometer with the sample.

3. The spectroscopic assembly of claim 1, where the mounting surface separates the spectrometer from the sample by a particular distance when the spectrometer is received at the first opening and the sample is received at the second opening.

4. The spectroscopic assembly of claim 1, where the glass window is a protective window that permits the light to be directed between the spectrometer and the sample.

5. The spectroscopic assembly of claim 1, where the sample is enclosed in a blister pack and the base surface is a particular surface of the blister pack.

6. The spectroscopic assembly of claim 1, where the light pipe further comprises:
a reflective interior surface disposed between the first opening and the second opening to cause the light to be directed between the spectrometer and the sample,
the reflective interior surface being at least one of:
a reflectively coated hollow portion,
a reflectively coated solid portion, or
a solid portion to cause a total internal reflection effect.

7. The spectroscopic assembly of claim 1, where the light pipe further comprises:
at least one of:
an optically reflective cap to reflect light from the illumination source and toward the sensor, or
an optically diffusive cap to diffuse light from the illumination source.

8. The spectroscopic assembly of claim 1, where the second opening further comprises:
a surface to support a sample tube,
the sample tube being associated with receiving a liquid sample or a solvent sample.

9. The spectroscopic assembly of claim 1, where the sample is a liquid sample or a solvent sample; and
where the second opening further comprises:
a first portion of the second opening to receive a first portion of a sample pipe; and
a second portion of the second opening to receive a second portion of the sample pipe,
a third portion of the sample pipe being aligned by the light pipe with the spectrometer,
the third portion of the sample pipe being positioned between the first portion of the sample pipe and the second portion of the sample pipe,
the sample pipe being associated with directing the liquid sample or the solvent sample from the first portion of the sample pipe to the third portion of the sample pipe and from the third portion of the sample pipe to the second portion of the sample pipe.

10. The spectroscopic assembly of claim 1, where the second opening includes a first window and a spacer; and
where the base surface includes a second window and a mirror.

11. An apparatus, comprising:
a spectrometer including an illumination source and a sensor,
a body portion,
the body portion including:
a cavity,
the cavity including a first portion and a second portion,
a first diameter of the first portion being different from a second diameter of the second portion,
the cavity extending axially from a first end of the first portion to a second end of the second portion,
the second end of the body portion being associated with reflecting light directed toward a sample for spectroscopy, and
the first end of the body portion being associated with receiving the spectrometer such that the spectrometer is separated from the sample to prevent the spectrometer from being in contact with the sample,
a mounting surface disposed between the first portion and the second portion, and
a glass window contiguous to the mounting surface.

12. The apparatus of claim 11, further comprising:
a dip probe mounted to the body portion,
the dip probe supporting a surface to reflect light or diffuse light received from the spectrometer, and
the dip probe being associated with positioning the surface in an axial alignment to the spectrometer.

13. The apparatus of claim 11, further comprising:
a reflective surface disposed in the cavity; and
a rotator assembly to rotate the reflective surface.

14. The apparatus of claim 11, further comprising:
a reflective surface disposed in the cavity,
the reflective surface being shaped to disperse the light in a plurality of directions toward the sample.

15. The apparatus of claim 11, where the sample is a fluid; and
further comprising:
a first opening in the cavity to receive the fluid; and
a second opening in the cavity to expel the fluid.

16. The apparatus of claim 11, further comprising:
a fiber optic structure disposed axially inside the cavity,
the fiber optic structure being associated with directing light between the spectrometer and the sample.

17. An apparatus, comprising:
a spectroscopic assembly,
the spectroscopic assembly including a spectrometer,
the spectrometer including an illumination source and a spectroscopic sensor;
the spectroscopic assembly including a light pipe,
the light pipe including:
a turned cavity,
the turned cavity including:
a first portion that includes a first opening to receive the spectrometer, and
a second portion that includes a second opening,
a first diameter of the first portion being different from a second diameter of the second portion,
a mounting surface disposed between the first portion and the second portion, and
a glass window contiguous to the mounting surface,
the turned cavity being optically reflective; and
the spectroscopic assembly including a support structure,
the support structure being mounted to the light pipe,
the support structure supporting a surface a particular distance from the illumination source, and
the particular distance permitting a sample to be positioned between the glass window and the surface.

18. The apparatus of claim 17, further comprising:
a processor to determine a set of components of the sample based on a set of calibration measurements and a set of spectroscopic measurements performed by the spectrometer.

19. The apparatus of claim 17, where the glass window is a translucent sapphire glass window.

20. The apparatus of claim 17, where the surface is a reflective surface or a diffusive surface.

* * * * *